United States Patent
Sugimura et al.

(10) Patent No.: US 6,225,410 B1
(45) Date of Patent: May 1, 2001

(54) ETHYLENE/α-OLEFIN COPOLYMER AND PROCESS FOR PREPARING THE SAME

(75) Inventors: Kenji Sugimura; Ken Yoshitsugu; Mamoru Takahashi; Takashi Nakagawa, all of Kuga-gun (JP)

(73) Assignee: Mitsui Chemicals, Tokyo (JP)

( * ) Notice: Subject to any disclaimer, the term of this patent is extended or adjusted under 35 U.S.C. 154(b) by 0 days.

(21) Appl. No.: 09/219,931

(22) Filed: Dec. 23, 1998

(30) Foreign Application Priority Data

Dec. 25, 1997 (JP) .................................................. 9-358272
Feb. 27, 1998 (JP) ................................................ 10-048121

(51) Int. Cl.$^7$ ............................ C08F 10/02; C08F 10/04; C08F 10/14
(52) U.S. Cl. ..................... 525/191; 5352/240; 5352/322; 5352/324; 526/119; 526/160; 526/943; 526/348.1; 526/348.2
(58) Field of Search ................................ 526/348.2, 119, 526/943, 348.1, 160; 525/240, 322, 324, 191

(56) References Cited

U.S. PATENT DOCUMENTS

| | | | |
|---|---|---|---|
| 5,464,905 | * 11/1995 | Tsutsui et al. | 525/240 |
| 5,663,236 | * 9/1997 | Takashashi et al. | 525/240 |
| 5,674,945 | * 10/1997 | Takahashi et al. | 525/240 |
| 5,708,080 | * 1/1998 | Tsutsui et al. | 525/74 |
| 5,723,399 | * 3/1998 | Takemoto et al | 502/113 |
| 5,770,664 | * 6/1998 | Okumura et al. | 526/127 |
| 5,834,557 | * 11/1998 | Tsutsui et al. | 525/71 |
| 6,001,941 | * 12/1999 | Tsutsui et al. | 526/348.2 |

FOREIGN PATENT DOCUMENTS

| | | | |
|---|---|---|---|
| 0 653 445 | * | 5/1995 | (EP) . |
| 0 733 652 | * | 9/1996 | (EP) . |
| 0 745 616 | * | 12/1996 | (EP) . |
| 0 752 428 | * | 1/1997 | (EP) . |
| 0 781 789 | * | 7/1997 | (EP) . |
| 09094932 | * | 9/1996 | (JP) . |
| 08253635 | * | 10/1996 | (JP) . |

* cited by examiner

*Primary Examiner*—David W. Wu
*Assistant Examiner*—Ling-Siu Choi

(57) ABSTRACT

Ethylene/$C_{6-8}$ alpha-olefin copolymers are characterized by melt tension, flow activation energy and haze. The copolymers have excellent moldability and produce films of excellent transparency and mechanical strength.

8 Claims, 1 Drawing Sheet

(A) Transition metal compound $ML^1 x$ ··· ( I )
( M is a transition metal atom of Group 4 ; at least two ligands $L^1$ are each a substituted Cp group having at least one group selected from hydrocarbon group of 3 to 10 carbon atoms, and x is a valence of the transition metal M. )

$ML^2 x$ ··· ( II )
( M is a transition metal atom of Group 4 ; at least two ligands $L^2$ are each a methyl Cp group or an ethyl Cp group, and x is a valence of the transition metal M. )

Cp group : cyclopentadienyl group (B) Organometallic component

Organoaluminum oxy-compound (C) Third component ( Carrier )

Olefin

Fig. 1

(A) Transition metal compound $ML^1{}_x$ ... (I)

(M is a transition metal atom of Group 4; at least two ligands $L^1$ are each a substituted Cp group having at least one group selected from hydrocarbon group of 3 to 10 carbon atoms, and x is a valence of the transition metal M.)

$ML^2{}_x$ ... (II)

(M is a transition metal atom of Group 4; at least two ligands $L^2$ are each a methyl Cp group or an ethyl Cp group, and x is a valence of the transition metal M.)

Cp group : cyclopentadienyl group (B) Organometallic component

Organoaluminum oxy-compound (C) Third component ( Carrier )

Olefin

ETHYLENE/α-OLEFIN COPOLYMER AND PROCESS FOR PREPARING THE SAME

FIELD OF THE INVENTION

The present invention relates to an ethylene/α-olefin copolymer, and more particularly to an ethylene/α-olefin copolymer having excellent moldability and capable of producing films of excellent transparency and mechanical strength. The invention also relates to an ethylene copolymer composition whose content and usefulness are substantially the same as those of the ethylene/α-olefin copolymer.

The invention further relates to a composition comprising either the ethylene/α-olefin copolymer or the ethylene copolymer composition and another ethylene copolymer.

The invention still further relates to a process for preparing the ethylene/α-olefin copolymer.

BACKGROUND OF THE INVENTION

Ethylene copolymers are molded by various molding methods and used in many fields. The properties required for the ethylene copolymers differ from each other according to the molding methods and the uses of the copolymers. For example, in the production of an inflation film by a high-speed molding method, an ethylene copolymer having high melt tension for its molecular weight must be selected in order to stably perform high-speed molding free from occurrence of bubble swing or bubble break. The similar properties are required to prevent sag or break in a blow molding method or to lower reduction of width to the minimum in a T-die molding method.

In Japanese Patent Laid-Open Publication No. 90810/1981 or No. 106806/1985, a method of increasing melt tension or swell ratio (die swell ratio) of ethylene polymers obtained by the use of Ziegler catalysts, particularly titanium catalysts, to improve moldability of the polymers is reported. In general, the ethylene polymers obtained by the use of the titanium catalysts, particularly low-density ethylene copolymers, however, have wide composition distribution and contain components which cause tackiness when the polymers are used as molded products such as films. Therefore, decrease of the components causing tackiness has been demanded.

Of the ethylene polymers produced by the use of Ziegler catalysts, those obtained by the use of chromium catalysts have relatively high melt tension, but further improvement in the heat stability has been demanded.

A great number of ethylene copolymers obtained by the use of olefin polymerization catalysts containing transition metal metallocene compounds have high melt tension and excellent heat stability, so that they are expected as copolymers filling the above demands. In the ethylene copolymers obtained by the use of the metallocene catalysts, however, the melt tension (MT) is generally proportional to the flow activation energy (Ea).

Polymers having high melt tension show excellent moldability because the bubble stability is good as mentioned above, but they show high flow activation energy (Ea), and this means that the molding conditions thereof have great dependence on the temperature. Therefore, if the molding conditions are not controlled very strictly and uniformly, the resulting molded products suffer unevenness. For example, films may have low transparency.

When the flow activation energy (Ea) is low, occurrence of unevenness in the molded products can be inhibited, but because of low melt tension, unstable bubble is produced and hence moldability is lowered.

OBJECT OF THE INVENTION

The present invention has been made under such circumstances as mentioned above, and it is an object of the invention to provide an ethylene/α-olefin copolymer having excellent moldability and capable of producing films of excellent transparency and mechanical strength. It is another object of the invention to provide an ethylene copolymer composition whose content and usefulness are substantially the same as those of the ethylene/α-olefin copolymer.

SUMMARY OF THE INVENTION

The ethylene/α-olefin copolymer (A) according to the invention is a copolymer of ethylene and an α-olefin of 6 to 8 carbon atoms and has the following properties:

(A-i) the melt tension (MT) at 190° C. and the melt flow rate (MFR) satisfy the following relation $$9.0 \times MFR^{-0.65} > MT > 2.2 \times MFR^{-0.84},$$

(A-ii) the flow activation energy (($E_a$)×10$^{-4}$ J/molK) determined from a shift factor of time-temperature superposition of the flow curve, the carbon atom number (C) of the α-olefin in the copolymer and the α-olefin content (x mol %) in the copolymer satisfy the following relation $$(0.039Ln(C-2)+0.0096) \times x + 2.87 < (E_a) \times 10^{-4} \leq (0.039Ln(C-2)+0.1660) \times x + 2.87,$$

and (A-iii) the haze of a film having a thickness of 30 μm produced from the copolymer by inflation molding satisfies the following conditions:

where the flow index (FI) defined as a shear rate which is given when the shear stress reaches 2.4×10$^6$ dyne/cm$^2$ at 190° C. and the melt flow rate (MFR) satisfy the relation FI≧100×MFR, in case of the carbon atom number (C) of the α-olefin being 6, $$Haze < 0.45/(1-d) \times \log(3 \times MT^{1.4}) \times (C-3)^{0.1}$$

in case of the carbon atom number (C) of the α-olefin being 7 or 8, $$Haze < 0.50/(1-d) \times \log(3 \times MT^{1.4}),$$

and where the flow index (FI) defined as a shear rate which is given when the shear stress reaches 2.4×10$^6$ dyne/cm$^2$ at 190° C. and the melt flow rate (MFR) satisfy the relation FI<100×MFR, in case of the carbon atom number (C) of the α-olefin being 6, $$Haze < 0.25/(1-d) \times \log(3 \times MT^{1.4}) \times (C-3)^{0.1},$$

in case of the carbon atom number (C) of the α-olefin being 7 or 8, $$Haze < 0.50/(1-d) \times \log(3 \times MT^{1.4})$$

wherein d represents density (g/cm$^3$) and MT represents melt tension (g).

The ethylene/α-olefin copolymer (A) of the invention can be obtained by copolymerizing ethylene and an α-olefin of 6 to 8 carbon atoms in the presence of an olefin polymerization catalyst comprising:

(a) an organoaluminum oxy-compound;

(b-I) at least one transition metal compound selected from transition metal compounds represented by the following formula (I):

$$ML^1_x \qquad (I)$$

wherein M is a transition metal atom selected from Group 4 of the periodic table; $L^1$ is a ligand coordinated to the transition metal atom M, at least two ligands $L^1$ are each a substituted cyclopentadienyl group having at least one group selected from hydrocarbon groups of 3 to 10 carbon atoms, and the ligand $L^1$ other than the substituted cyclopentadienyl group is a hydrocarbon group of 1 to 12 carbon atoms, an alkoxy group, an aryloxy group, a trialkylsilyl group, a halogen atom or a hydrogen atom; and x is a valence of the transition metal atom M;

and (b-II) at least one transition metal compound selected from transition metal compounds represented by the following formula (II):

$$ML^2_x \qquad (II)$$

wherein M is a transition metal atom selected from Group 4 of the periodic table; $L^2$ is a ligand coordinated to the transition metal atom M, at least two ligands $L^2$ are each a methylcyclopentadienyl group or an ethylcyclopentadienyl group, and the ligand $L^2$ other than the methylcyclopentadienyl group or the ethylcyclopentadienyl group is a hydrocarbon group of 1 to 12 carbon atoms, an alkoxy group, an aryloxy group, a trialkylsilyl group, a halogen atom or a hydrogen atom; and x is a valence of the transition metal atom M.

The olefin polymerization catalyst preferably further comprises (c) a carrier on which the organoaluminum oxy-compound (a), the transition metal compound (b-I) and the transition metal compound (b-II) are supported.

The ethylene/α-olefin copolymer (A) has excellent moldability and can produce films of excellent transparency and mechanical strength.

The ethylene copolymer composition (A') according to the invention has substantially the same content and usefulness as those of the ethylene/α-olefin copolymer, and is a composition comprising:

(B) an ethylene/α-olefin copolymer, and
(C) an ethylene/α-olefin copolymer,
said ethylene/α-olefin copolymer (B) being a copolymer of ethylene and an α-olefin of 6 to 8 carbon atoms and having the following properties:

(B-i) the density is in the range of 0.880 to 0.970 g/cm³,
(B-ii) the melt flow rate (MFR) at 190° C. under a load of 2.16 kg is in the range of 0.02 to 200 g/10 min,
(B-iii) the decane-soluble component fraction (W) at room temperature and the density (d) satisfy the following relation
in case of MFR≦10 g/10 min, $$W<80\times\exp(-100(d-0.88))+0.1,$$

in case of MFR>10 g/10 min, $$W<80\times(MFR-9)^{0.26}\times\exp(-100(d-0.88))+0.1,$$

(B-iv) the temperature (Tm) at the maximum peak position of an endothermic curve of the copolymer as measured by a differential scanning calorimeter (DSC) and the density (d) satisfy the following relation $$Tm<400\times d-248,$$

(B-v) the melt tension (MT) at 190° C. and the melt flow rate (MFR) satisfy the following relation $$9.0\times MFR^{-0.65}>MT>2.2\times MFR^{-0.84},$$

(B-vi) the flow activation energy $((E_a)\times10^{-4}$ J/molK) determined from a shift factor of time-temperature superposition of the flow curve, the carbon atom number (C) of the α-olefin in the copolymer and the α-olefin content (x mol %) in the copolymer satisfy the following relation $$(0.039Ln(C-2)+0.0096)\times x+2.87<(E_a)\times10^{-4}\leq(0.039Ln(C-2)+0.1660)\times x+2.87,$$

and
(B-vii) The ratio (Mw/Mn) of the weight-average molecular weight (Mw) to the number-average molecular weight (Mn), as determined by GPC, satisfies the following condition $$2.2<Mw/Mn<3.5;$$

said ethylene/α-olefin copolymer (C) being a copolymer of ethylene and an α-olefin of 6 to 8 carbon atoms and having the following properties:
(C-i) the density is in the range of 0.880 to 0.970 g/cm³,
(C-ii) the melt flow rate (MFR) at 190° C. under a load of 2.16 kg is in the range of 0.02 to 200 g/10 min,
(C-iii) the decane-soluble component fraction (W) at room temperature and the density (d) satisfy the following relation
in case of MFR≦10 g/10 min, $$W<80\times\exp(-100(d-0.88))+0.1,$$

in case of MFR>10 g/10 min, $$W<80\times(MFR-9)^{0.26}\times\exp(-100(d-0.88))+0.1,$$

(C-iv) the temperature (Tm) at the maximum peak position of an endothermic curve of the copolymer as measured by a differential scanning calorimeter (DSC) and the density (d) satisfy the following relation $$Tm<400\times d-248,$$

and
(C-v) the melt tension (MT) at 190° C. and the melt flow rate (MFR) satisfy the following relation $$MT\leq2.2\times MFR^{-0.84};$$

wherein the ratio of the melt flow rate (MFR(C)) of the copolymer (C) to the melt flow rate (MFR(B)) of the copolymer (B) satisfies the following condition:

$$1<(MFR(C))/(MFR(B))\leq20.$$

It is preferable that the ethylene/α-olefin copolymers (B) and (C) in the ethylene copolymer composition (A') are both ethylene/1-hexene copolymers and, in this case, the ethylene copolymer composition (A') has the following properties:
(A'-i) the melt tension (MT) at 190° C. and the melt flow rate (MFR) satisfy the following relation $$9.0\times MFR^{-0.65}>MT>2.2\times MFR^{-0.84},$$

(A'-ii) the flow activation energy $((E_a)\times10^{-4}$ J/molK) determined from a shift factor of time-temperature superposition of the flow curve, the carbon atom number (C) of 1-hexene in the copolymers (B) and (C), and the total content (x mol %) of 1-hexene in the copolymers (B) and (C) satisfy the following relation $(0.039\mathrm{Ln}(C-2)+0.0096) \times x+2.87 < (E_a) \times 10^{-4} \leq (0.039\mathrm{Ln}(C-2)+0.1660) \times x+2.87,$ and (A'-iii) the haze of a film having a thickness of 30 μm produced from the copolymer composition by inflation molding satisfies the following conditions:

where the flow index (FI) defined as a shear rate which is given when the shear stress reaches $2.4 \times 10^6$ dyne/cm$^2$ at 190° C. and the melt flow rate (MFR) satisfy the relation FI≧100×MFR, $\mathrm{Haze} < 0.45/(1-d) \times \log(3 \times \mathrm{MT}^{1.4}) \times (C-3)^{0.1}$ and where the flow index (FI) defined as a shear rate which is given when the shear stress reaches $2.4 \times 10^6$ dyne/cm$^2$ at 190° C. and the melt flow rate (MFR) satisfy the relation FI<100×MFR,.

$\mathrm{Haze} < 0.25/(1-d) \times \log(3 \times \mathrm{MT}^{1.4}) \times (C-3)^{0.1}$ wherein d represents density (g/cm$^3$), MT represents melt tension (g), and C represents the carbon atom number of 1-hexene, namely, 6.

It is also preferable that the ethylene copolymer composition (A') further has, in addition to the properties (A'-i) to (A'-iii), the following property:

(A'-iv) the ratio (Mw/Mn) of the weight-average molecular weight (Mw) to the number-average molecular weight (Mn), as determined by GPC, satisfies the following condition $2.0 \leq \mathrm{Mw/Mn} \leq 2.5.$ The ethylene/α-olefin copolymer (A) of the invention or the ethylene copolymer composition (A') of the invention can be blended with:

(D) an ethylene/α-olefin copolymer which is obtained by copolymerizing ethylene and an α-olefin of 3 to 20 carbon atoms in the presence of an olefin polymerization catalyst comprising (a) an organoaluminum oxy-compound and (b-III) a transition metal compound of a transition metal of Group 4 of the periodic table containing a ligand having cyclopentadienyl skeleton, and which has the following properties:

(D-i) the density is in the range of 0.850 to 0.980 g/cm$^3$, and (D-ii) the intrinsic viscosity (i), as measured in decalin at 135° C., is in the range of 0.4 to 8 dl/g;

with the proviso that the ethylene/α-olefin copolymer (A) is not identical with the ethylene/α-olefin copolymer (D), and each of the ethylene/α-olefin copolymers (B) and (C) is not identical with the ethylene/α-olefin copolymer (D).

The process for preparing an ethylene/α-olefin copolymer according to the invention comprises copolymerizing ethylene and an α-olefin of 6 to 8 carbon atoms in the presence of the above-mentioned olefin polymerization catalyst comprising (a) the organoaluminum oxy-compound, (b-I) the transition metal compound and (b-II) the transition metal compound.

BRIEF DESCRIPTION OF THE DRAWING

FIG. 1 is an explanatory view showing steps for preparing an olefin polymerization catalyst for use in the present invention.

DETAILED DESCRIPTION OF THE INVENTION

The ethylene/α-olefin copolymer (A) according to the invention, the process for preparing the copolymer and the ethylene copolymer composition (A') are described in detail hereinafter.

The meaning of the term "polymerization" used herein is not limited to "homopolymerization" but may comprehend "copolymerization". Also, the meaning of the term "polymer" used herein is not limited to "homopolymer" but may comprehend "copolymer".

Ethylene/α-olefin copolymer (A)

The ethylene/α-olefin copolymer (A) according to the invention is a random copolymer of ethylene and an α-olefin of 6 to 8 carbon atoms. Examples of the α-olefins of 6 to 8 carbon atoms preferably used in the copolymerization with ethylene include straight-chain α-olefins having no branch, such as 1-hexene, 1-heptene and 1-octene. Of these, 1-hexene is particularly preferably employed.

The ethylene/α-olefin copolymer (A) of the invention has the following properties (A-i) to (A-iii).

(A-i) The melt tension (MT (g)) and the melt flow rate (MFR (g/10 min)) satisfy the following relation:

$9.0 \times \mathrm{MFR}^{-0.65} > \mathrm{MT} > 2.2 \times \mathrm{MFR}^{-0.84},$ preferably $9.0 \times \mathrm{MFR}^{-0.65} > \mathrm{MT} > 2.3 \times \mathrm{MFR}^{-0.84},$ more preferably $8.5 \times \mathrm{MFR}^{-0.65} > \mathrm{MT} > 2.5 \times \mathrm{MFR}^{-0.84}.$ The ethylene/α-olefin copolymer having the above property shows high melt tension, so that it has excellent moldability.

The MFR is measured under the conditions of a temperature of 190° C. and a load of 2.16 kg in accordance with the method of ASTM D1238-65T.

The melt tension (MT) is determined by measuring a stress given when a molten polymer is stretched at a constant rate. That is, the produced polymer powder was melted and pelletized in a conventional manner to give a measuring sample, and the melt tension of the sample was measured by a MT measuring machine manufactured by Toyo Seiki Seisakusho K.K. under the conditions of a resin temperature of 190° C., an extrusion rate of 15 mm/min, a take-up rate of 10 to 20 m/min, a nozzle diameter of 2.09 mmφ and a nozzle length of 8 mm. Prior to pelletizing, the ethylene/α-olefin copolymer was blended with 0.05% by weight of tri(2,4-di-t-butylphenyl)phosphate as a secondary antioxidant, 0.1% by weight of n-octadecyl-3-(4'-hydroxy-3',5'-di-t-butylphenyl)propionate as a heat stabilizer and 0.05% by weight of calcium stearate as a hydrochloric acid absorber.

(A-ii) The flow activation energy (($E_a$)×10$^{-4}$ J/molK) determined from a shift factor of time-temperature superposition of the flow curve, the carbon atom number (C) of the α-olefin in the copolymer and the α-olefin content (x mol %) in the copolymer satisfy the following relation $(0.039\mathrm{Ln}(C-2)+0.0096) \times x+2.87 < (E_a) \times 10^{-4} \leq (0.039\mathrm{Ln}(C-2)+0.1660) \times x+2.87,$ preferably $(0.039\mathrm{Ln}(C-2)+0.0096) \times x+2.87 < (E_a) \times 10^{-4} \leq (0.039\mathrm{Ln}(C-2)+0.1500) \times x+2.87,$ more preferably $(0.039\mathrm{Ln}(C-2)+0.0096) \times x+2.87 < (E_a) \times 10^{-4} \leq (0.039\mathrm{Ln}(C-2)+0.1300) \times x+2.87.$ In order to improve moldability into films, the melt tension needs to be increased, and to increase the melt tension, introduction of long-chain branch is known as an effective method. $E_a$ of the ethylene/α-olefin copolymer having no long-chain branch is expressed by the equation: $E_a \times 10^{-4} = (0.039 \text{Ln}(C-2) + 0.0096) \times x + 2.87$. When the long-chain branch is present, the value of $E_a$ increases, so that in case of $E_a \times 10^{-4} > (0.039 \text{Ln}(C-2) + 0.0096) \times x + 2.87$, a long-chain branch is presumed to be present, and the moldability into films and the transparency are improved. In case of $E_a \times 10^{-4} > (0.039 \text{Ln}(C-2) + 0.1660) \times x + 2.87$, though the moldability is good, film strength and film transparency are lowered, so that such a case is unfavorable.

Measurement of the flow activation energy ($E_a$) is described in, for example, "Polymer Experimental Science, Vol. 9, Thermodynamic Properties I" (edited by Polymer Experimental Science Editorial Committee of Polymer Society, Kyoritsu Publishing K.K., pp. 25–28), and the flow activation energy ($E_a$) is determined from a shift factor of time-temperature superposition of the flow curve by measuring dependence of viscoelasticity on frequency. A graph showing a relation between storage elastic modulus (ordinate) and angular velocity (abscissa) measured at a certain base temperature is fixed. Then, data measured at a different measuring temperature are moved in parallel with the abscissa, and as a result they overlap the data obtained at the base temperature (thermal rheological simplicity). The shift Log(aT), by which the data obtained at the measuring temperature overlap the data obtained at the base temperature, is plotted against a reciprocal number 1/T of the measuring temperature (absolute temperature) to obtain linear gradient. The linear gradient is multiplied by 2.303R (R: gas constant), whereby the activation energy is obtained as a temperature-independent constant.

Specifically, $E_a$ is determined in the following manner.

Dispersion of the storage viscoelasticity (G' ($dyne/cm^2$)) at the angular velocity (ω (rad/sec)) was measured. A parallel plate having a diameter of 25 mmφ was used as a sample holder. The thickness of the sample was about 2 mm. The measuring temperatures were 130, 170, 200 and 230° C., and at each temperature, G' was measured in the range of $0.04 \leq \omega \leq 400$. For example, in the measurement at 130° C., the sample was heated to 150° C. to completely melt the crystals and then cooled to 130° C. The strain was properly selected from the range of 2 to 25% so that the torque was detectable in the measuring range and did not become too much. After the measurement, flow curves obtained under the four temperature conditions were superposed taking 130° C. as the base temperature, and from the Arrhenius type plot of the shift factor, $E_a$ value was calculated. The calculation was performed using analytical software RHIOS attached to RDS-II.

(A-iii) The haze of a film having a thickness of 30 μm produced from the copolymer by inflation molding satisfies the following conditions:

where the flow index (FI) defined as a shear rate which is given when the shear stress reaches $2.4 \times 10^6$ dyne/cm² at 190° C. and the melt flow rate (MFR) satisfy the relation $FI \geq 100 \times MFR$, in case of the carbon atom number (C) of the α-olefin being 6, $$\text{Haze} < 0.45/(1-d) \times \log(3 \times MT^{1.4}) \times (C-3)^{0.1}$$

in case of the carbon atom number (C) of the α-olefin being 7 or 8, $$\text{Haze} < 0.50/(1-d) \times \log(3 \times MT^{1.4}),$$

and where the flow index (FI) defined as a shear rate which is given when the shear stress reaches $2.4 \times 10^6$ dyne/cm² at 190° C. and the melt flow rate (MFR) satisfy the relation $FI < 100 \times MFR$, in case of the carbon atom number (C) of the α-olefin being 6, $$\text{Haze} < 0.25/(1-d) \times \log(3 \times MT^{1.4}) \times (C-3)^{0.1},$$

in case of the carbon atom number (C) of the α-olefin being 7 or 8, $$\text{Haze} < 0.50/(1-d) \times \log(3 \times MT^{1.4})$$

wherein d represents density (g/cm³) and MT represents melt tension (g).

The ethylene/α-olefin copolymer satisfying the above conditions has excellent moldability and is capable of producing films of excellent transparency.

The flow index is determined by extruding a resin through a capillary with varying a shear rate and finding a shear rate corresponding to the prescribed stress. That is, using the same sample as in the measurement of MT, the flow index is measured by a capillary flow property tester (manufactured by Toyo Seiki Seisakusho K.K.) under the conditions of a resin temperature of 190° C. and a shear stress of about $5 \times 10^4$ to $3 \times 10^6$ dyne/cm².

In this measurement, the diameter of nozzle was varied as follows according to the MFR (g/10 min) of the resin to be measured.

MFR>20: 0.5 mm

20≧MFR>3: 1.0 mm

3≧MFR>0.8: 2.0 mm 0.8≧MFR: 3.0 mm

The density (d) is measured in the following manner. Strands obtained in the measurement of melt flow rate (MFR) at 190° C. under a load of 2.16 kg are heated at 120° C. for 1 hour, then slowly cooled to room temperature over a period of 1 hour, and the density of the strands was measured by a density gradient tube.

It is preferable that the ethylene/α-olefin copolymer (A) of the invention further has the following properties in addition to the above-mentioned properties.

In the ethylene/α-olefin copolymer (A) of the invention, it is desired that the constituent units derived from ethylene are present in amounts of 50 to 100% by weight, preferably 55 to 99% by weight, more preferably 65 to 98% by weight, most preferably 70 to 96% by weight, and the constituent units derived from the α-olefin of 6 to 8 carbon atoms are present in amounts of 0 to 50% by weight, preferably 1 to 45% by weight, more preferably 2 to 35% by weight, particularly preferably 4 to 30% by weight.

The composition of an ethylene/α-olefin copolymer is generally determined in the following manner. About 200 mg of the copolymer is homogeneously dissolved in 1 ml of hexachlorobutadiene in a sample tube having a diameter of 10 mmφ to prepare a sample, and a $^{13}$C-NMR spectrum of the sample is measured under the measuring conditions of a measuring temperature of 120° C., a measuring frequency of 25.05 MHz, a spectral width of 1,500 Hz, a pulse repetition time of 4.2 sec and a pulse width of 6 μsec.

The ethylene/α-olefin copolymer (A) desirably has a density (d) of 0.880 to 0.970 g/cm³, preferably 0.880 to 0.960 g/cm³, more preferably 0.890 to 0.935 g/cm³, most preferably 0.905 to 0.930 g/cm³.

The ethylene/α-olefin copolymer (A) desirably has a melt flow rate (MFR) of 0.02 to 200 g/10 min, preferably 0.05 to 50 g/10 min, more preferably 0.1 to 10 g/10 min.

It is desirable that the n-decane-soluble component fraction (W) in the ethylene/α-olefin copolymer (A) at 23° C. and the density (d) satisfy the following relation in case of MFR≦10 g/10 min, $$W<80\times\exp(-100(d-0.88))+0.1,$$

preferably $$W<60\times\exp(-100(d-0.88))+0.1,$$

more preferably $$W<40\times\exp(-100(d-0.88))+0.1,$$

in case of MFR>10 g/10 min, $$W<80\times(MFR-9)^{0.26}\times\exp(-100(d-0.88))+0.1.$$

The n-decane-soluble component fraction (W) in an ethylene/α-olefin copolymer is measured in the following manner. About 3 g of the copolymer is added to 450 ml of n-decane, dissolved therein at 145° C. and cooled to 23° C. Then, the n-decane-insoluble portion is removed by filtration, and the n-decane-soluble portion is recovered from the filtrate.

A copolymer having a small fraction of the n-decane-soluble component has a narrow composition distribution.

It is desirable that the temperature (Tm, (° C.)) at the maximum peak position of an endothermic curve of the ethylene/α-olefin copolymer as measured by a differential scanning calorimeter (DSC) and the density (d (g/cm$^3$)) satisfy the following relation $$Tm<400\times d-248,$$

preferably Tm<450×d−296, more preferably Tm<500×d−343, particularly preferably Tm<550×d−392.

The temperature (Tm) at the maximum peak position of an endothermic curve of the ethylene/α-olefin copolymer as measured by a differential scanning calorimeter (DSC) is found from an endothermic curve which is obtained by heating a sample of about 5 mg up to 200° C. at a rate of 10° C./min in an aluminum pan, maintaining the sample at 200° C. for 5 minutes, cooling it to room temperature at a rate of 20° C./min and heating it at a rate of 10° C./min. In the measurement, an apparatus of DSC-7 model manufactured by Perkin-Elmer Co. is used.

The ethylene/α-olefin copolymer having the above-defined relation between the temperature at the maximum peak position of an endothermic curve as measured by a differential scanning calorimeter (DSC) and the density (d) and having the above-defined relation between the n-decane-soluble component fraction (W) and the density (d) has a narrow composition distribution.

The ethylene/α-olefin copolymers (A) mentioned above can be used in combination of two or more kinds.

The ethylene/α-olefin copolymer (A) of the invention can be obtained by copolymerizing ethylene and an α-olefin of 6 to 8 carbon atoms in the presence of an olefin polymerization catalyst (Cat-1) formed from:

(a) an organoaluminum oxy-compound, (b-I) at least one transition metal compound selected from transition metal compounds represented by the formula (I), and (b-II) at least one transition metal compound selected from transition metal compounds represented by the formula (II).

The olefin polymerization catalyst may further comprise (c) a carrier on which (a) the organoaluminum oxy-compound, (b-I) at least one transition metal compound selected from transition metal compounds represented by the formula (I), and (b-II) at least one transition metal compound selected from transition metal compounds represented by the formula (II) are supported. Such a supported catalyst is sometimes referred to as "Cat-2" hereinafter.

The components for forming the olefin polymerization catalysts (Cat-1) and (Cat-2) are described below. ps (a) Organoaluminum Oxy-compound The organoaluminum oxy-compound (a) (sometimes referred to as "component (a)" hereinafter) for use in the invention may be a benzene-soluble aluminoxane hitherto known or such a benzene-insoluble organoaluminum oxy-compound as disclosed in Japanese Patent Laid-Open Publication No. 276807/1990.

The aluminoxane can be prepared by, for example, the following processes, and is generally obtained as its hydrocarbon solution.

(1) An organoaluminum compound such as trialkylaluminum is added to a hydrocarbon medium suspension of a compound containing adsorption water or a salt containing water of crystallization, e.g., magnesium chloride hydrate, copper sulfate hydrate, aluminum sulfate hydrate, nickel sulfate hydrate or cerous chloride hydrate, so as to allow the organoaluminum compound to react with the adsorption water or the water of crystallization.

(2) Water, ice or water vapor is allowed to directly act on an organoaluminum compound such as trialkylaluminum in a medium such as benzene, toluene, ethyl ether or tetrahydrofuran.

(3) An organotin oxide such as dimethyltin oxide or dibutyltin oxide is allowed to react with an organoaluminum compound such as trialkylaluminum in a medium such as decane, benzene or toluene.

The aluminoxane may contain a small amount of an organometallic component. It is possible that the solvent or the unreacted organoaluminum compound is distilled off from the recovered solution of an aluminoxane and the remainder is redissolved in a solvent.

Examples of the organoaluminum compounds used for preparing the aluminoxane include trialkylaluminums, such as trimethylaluminum, triethylaluminum, tripropylaluminum, triisopropylaluminum, tri-n-butylaluminum, triisobutylaluminum, tri-sec-butylaluminum, tri-tert-butylaluminum, tripentylaluminum, trihexylaluminum, trioctylaluminum and tridecylaluminum; tricycloalkylaluminums, such as tricyclohexylaluminum and tricyclooctylaluminum; dialkylaluminum halides, such as dimethylaluminum chloride, diethylaluminum chloride, diethylaluminum bromide and diisobutylaluminum chloride; dialkylaluminum hydrides, such as diethylaluminum hydride and diisobutylaluminum hydride; dialkylaluminum alkoxides, such as dimethylaluminum methoxide and diethylaluminum ethoxide; and dialkylaluminum aryloxides, such as diethylaluminum phenoxide.

Of these, trialkylaluminums and tricycloalkylaluminums are particularly preferable.

Also employable as the organoaluminum compound is isoprenylaluminum represented by the following formula:

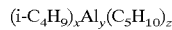

wherein x, y, z are each a positive number, and z≧2x.

The organoaluminum compounds mentioned above are used singly or in combination.

Examples of the solvents used for preparing the aluminoxane include aromatic hydrocarbons, such as benzene, toluene, xylene, cumene and cymene; aliphatic hydrocarbons, such as pentane, hexane, heptane, octane, decane, dodecane, hexadecane and octadecane; alicyclic hydrocarbons, such as cyclopentane, cyclohexane, cyclooctane and methylcyclopentane; petroleum fractions, such as gasoline, kerosine and gas oil; and halogenated products of these aromatic, aliphatic and alicyclic hydrocarbons, such as chlorinated or brominated products thereof. Also employable are ethers such as ethyl ether and tetrahydrofuran. Of the solvents, aromatic hydrocarbons are particularly preferable.

The benzene-insoluble organoaluminum oxy-compound employable in the invention contains an Al component soluble in benzene at 60° C. in an amount of not more than 10%, preferably not more than 5%, particularly preferably not more than 2%, in terms of Al atom, and is insoluble or sparingly soluble in benzene.

The solubility of the organoaluminum oxy-compound in benzene can be determined in the following manner. The organoaluminum oxy-compound in an amount corresponding to 100 mg·atom of Al is suspended in 100 ml of benzene, and they are mixed at 60° C. for 6 hours with stirring. Then, the mixture is subjected to hot filtration at 60° C. using a jacketed G-5 glass filter, and the solid separated on the filter is washed four times with 50 ml of benzene at 60° C. to obtain a filtrate. The amount (x mmol) of Al atom present in the whole filtrate is measured to determine the solubility (x %).

(b-I) Transition Metal Compound and (b-II) Transition Metal Compound

The transition metal compound (b-I) for use in the invention is a transition metal compound represented by the following formula (I), and the transition metal compound (b-II) for use in the invention is a transition metal compound represented by the following formula (II).

$$ML^1_x \qquad (I)$$

wherein M is a transition metal atom selected from Group 4 of the periodic table; $L^1$ is a ligand coordinated to the transition metal atom M, at least two ligands $L^1$ are each a substituted cyclopentadienyl group having at least one group selected from hydrocarbon groups of 3 to 10 carbon atoms, and the ligand $L^1$ other than the substituted cyclopentadienyl group is a hydrocarbon group of 1 to 12 carbon atoms, an alkoxy group, an aryloxy group, a trialkylsilyl group, a halogen atom or a hydrogen atom; and x is a valence of the transition metal atom M.

$$ML^2_x \qquad (II)$$

wherein M is a transition metal atom selected from Group 4 of the periodic table; $L^2$ is a ligand coordinated to the transition metal atom M, at least two ligands $L^2$ are each a methylcyclopentadienyl group or an ethylcyclopentadienyl group, and the ligand $L^2$ other than the methylcyclopentadienyl group or the ethylcyclopentadienyl group is a hydrocarbon group of 1 to 12 carbon atoms, an alkoxy group, an aryloxy group, a trialkylsilyl group, a halogen atom or a hydrogen atom; and x is a valence of the transition metal atom M.

The transition metal compound represented by the formula (I) or (II) is described below in more detail.

In the formula (I), M is a transition metal atom selected from Group 4 of the periodic table, specifically zirconium, titanium or hafnium, preferably zirconium.

$L^1$ is a ligand coordinated to the transition metal atom M, and at least two ligands $L^1$ are each a substituted cyclopentadienyl group having at least one group selected from hydrocarbon groups of 3 to 10 carbon atoms. These ligands $L^1$ may be the same or different.

The substituted cyclopentadienyl group may have two or more substituents, and the two or more substituents may be the same or different. When the substituted cyclopentadienyl group has two or more substituents, at least one substituent is a hydrocarbon group of 3 to 10 carbon atoms, and the residual substituent is methyl, ethyl or a hydrocarbon group of 3 to 10 carbon atoms.

Examples of the hydrocarbon groups of 3 to 10 carbon atoms include alkyl groups, cycloalkyl groups, aryl groups and aralkyl groups. Specifically, there can be mentioned alkyl groups, such as n-propyl, isopropyl, n-butyl, isobutyl, sec-butyl, t-butyl, pentyl, hexyl, octyl, 2-ethylhexyl and decyl; cycloalkyl groups, such as cyclopentyl and cyclohexyl; aryl groups, such as phenyl and tolyl; and aralkyl groups, such as benzyl and neophyl.

Of these, preferable are alkyl groups, and particularly preferable are n-propyl and n-butyl. The substituted cyclopentadienyl group coordinated to the transition metal preferably is a di-substituted cyclopentadienyl group and particularly preferably is a 1,3-substituted cyclopentadienyl group.

In the formula (I), the ligand $L^1$ other than the substituted cyclopentadienyl group coordinated to the transition metal atom M is a hydrocarbon group of 1 to 12 carbon atoms, an alkoxy group, an aryloxy group, a trialkylsilyl group, a halogen atom or a hydrogen atom.

Examples of the hydrocarbon groups of 1 to 12 carbon atoms include alkyl groups, cycloalkyl groups, aryl groups and aralkyl groups. Specifically, there can be mentioned alkyl groups, such as methyl, ethyl, n-propyl, isopropyl, n-butyl, isobutyl, sec-butyl, t-butyl, pentyl, hexyl, octyl, 2-ethylhexyl and decyl; cycloalkyl groups, such as cyclopentyl and cyclohexyl; aryl groups, such as phenyl and tolyl; and aralkyl groups, such as benzyl and neophyl.

Examples of the alkoxy groups include methoxy, ethoxy, n-propoxy, isopropoxy, n-butoxy, isobutoxy, sec-butoxy, t-butoxy, pentoxy, hexoxy and octoxy.

Examples of the aryloxy groups include phenoxy.

Examples of the trialkylsilyl groups include trimethylsilyl, triethylsilyl and triphenylsilyl.

The halogen atom is fluorine, chlorine, bromine or iodine.

Examples of the transition metal compounds represented by the formula (I) include bis(n-propylcyclopentadienyl) zirconium dichloride, bis(n-butylcyclopentadienyl) zirconium dichloride, bis(n-hexylcyclopentadienyl) zirconium dichloride, bis(methyl-n-propylcyclopentadienyl) zirconium dichloride, bis(methyl-n-butylcyclopentadienyl) zirconium dichloride, bis(dimethyl-n-butylcyclopentadienyl)zirconium dichloride, bis(n-butylcyclopentadienyl)zirconium dibromide, bis(n-butylcyclopentadienyl)zirconium methoxychloride, bis(n-butylcyclopentadienyl)zirconium ethoxychloride, bis(n-butylcyclopentadienyl)zirconium butoxychloride, bis (n-butylcyclopentadienyl) zirconium diethoxide, bis (n-butylcyclopentadienyl) zirconium methylchloride, bis(n-butylcyclopentadienyl)zirconium dimethyl, bis(n-butylcyclopentadienyl)zirconium benzylchloride, bis(n-butylcyclopentadienyl)zirconium dibenzyl, bis(n-butylcyclopentadienyl)zirconium phenylchloride and bis(n-butylcyclopentadienyl)zirconium hydride chloride.

In the above examples, the di-substituted cyclopentadienyl rings include 1,2- and 1,3-substituted cyclopentadienyl rings, and the tri-substituted cyclopentadienyl rings include 1,2,3- and 1,2,4-substituted cyclopentadienyl rings.

Also employable in the invention are transition metal compounds wherein a zirconium metal is replaced with a titanium metal or a hafnium metal in the above-mentioned zirconium compounds.

Of the transition metal compounds represented by the formula (I), particularly preferable are bis(n-propylcyclopentadienyl)zirconium dichloride, bis(n-butylcyclopentadienyl)zirconium dichloride, bis(1-methyl-3-n-propylcyclopentadienyl)zirconium dichloride and bis(1-methyl-3-n-butylcyclopentadienyl)zirconium dichloride.

In the formula (II), M is a transition metal atom selected from Group 4 of the periodic table, specifically zirconium, titanium or hafnium, preferably zirconium.

$L^2$ is a ligand coordinated to the transition metal atom M, and at least two ligands $L^2$ are each a methylcyclopentadienyl group or an ethylcyclopentadienyl group. These ligands $L^2$ may be the same or different.

In the formula (II), the ligand $L^2$ other than the methylcyclopentadienyl group or the ethylcyclopentadienyl group is a hydrocarbon group of 1 to 12 carbon atoms, an alkoxy group, an aryloxy group, a trialkylsilyl group, a halogen atom or a hydrogen atom, each of which is the same group or atom as indicated by $L^1$ in the formula (I).

Examples of the transition metal compounds represented by the formula (II) include bis(methylcyclopentadienyl)zirconium dichloride,
bis(ethylcyclopentadienyl)zirconium dichloride,
bis(methylcyclopentadienyl)zirconium dibromide,
bis(ethylcyclopentadienyl)zirconium dibromide,
bis(methylcyclopentadienyl)zirconium methoxychloride,
bis(ethylcyclopentadienyl)zirconium methoxychloride,
bis(methylcyclopentadienyl)zirconium ethoxychloride,
bis(ethylcyclopentadienyl)zirconium ethoxychloride,
bis(methylcyclopentadienyl)zirconium diethoxide,
bis(ethylcyclopentadienyl)zirconium diethoxide,
bis(methylcyclopentadienyl)zirconium methylchloride,
bis(ethylcyclopentadienyl)zirconium methylchloride,
bis(methylcyclopentadienyl)zirconium dimethyl,
bis(ethylcyclopentadienyl)zirconium dimethyl,
bis(methylcyclopentadienyl)zirconium benzylchloride,
bis(ethylcyclopentadienyl)zirconium benzylchloride,
bis(methylcyclopentadienyl)zirconium dibenzyl,
bis(ethylcyclopentadienyl)zirconium dibenzyl,
bis(methylcyclopentadienyl)zirconium phenylchloride,
bis(ethylcyclopentadienyl)zirconium phenylchloride,
bis(methylcyclopentadienyl)zirconium hydride chloride
and bis(ethylcyclopentadienyl)zirconium hydride chloride.

Also employable in the invention are transition metal compounds wherein a zirconium metal is replaced with a titanium metal or a hafnium metal in the above-mentioned zirconium compounds.

Of the transition metal compounds represented by the formula (II), particularly preferable are bis (methylcyclopentadienyl) zirconium dichloride and bis (ethylcyclopentadienyl)zirconium dichloride.

In the present invention, at least one transition metal compound selected from the transition metal compounds represented by the formula (I) and at least one transition metal compound selected from the transition metal compounds represented by the formula (II) are used in combination as the transition metal compound components. It is preferable that a combination of the transition metal compounds is selected so that the ratio of the MFR (MFR(I)) of an olefin polymer obtained by the use of a catalyst component containing only the transition metal compound represented by the formula (I) as the transition metal compound component to the MFR (MFR(II)) of an olefin polymer obtained by the use of a catalyst component containing only the transition metal compound represented by the formula (II) as the transition metal compound component under the same polymerization conditions (MFR(I)/MFR(II)) satisfies the condition of MFR(I)/MFR(II)$\leq$20.

Examples of such combinations include a combination of bis(1,3-n-butylmethylcyclopentadienyl)zirconium dichloride and bis(methylcyclopentadienyl)zirconium dichloride, a combination of bis(1,3-n-propylmethylcyclopentadienyl) zirconium dichloride and bis (methylcyclopentadienyl) zirconium dichloride, and a combination of bis(n-butylcyclopentadienyl)zirconium dichloride and bis (methylcyclopentadienyl)zirconium dichloride.

The at least one transition metal compound (b-I) selected from the transition metal compounds represented by the formula (I) and the at least one transition metal compound (b-II) selected from the transition metal compounds represented by the formula (II) are desirably used in such amounts that the (b-I)/(b-II) molar ratio becomes 99/1 to 40/60, preferably 95/5 to 45/55, more preferably 90/10 to 50/50, most preferably 85/15 to 55/45.

The transition metal compound catalyst component containing at least one transition metal compound (b-I) selected from the transition metal compounds represented by the formula (I) and at least one transition metal compound (b-II) selected from the transition metal compounds represented by the formula (II) is sometimes referred to as "component (b)" hereinafter.

Although the olefin polymerization catalyst (Cat-1) formed from the organoaluminum oxy-compound (a), the transition metal compound (b-I) and the transition metal compound (b-II) is used in the invention, a catalyst (Cat-2) in which the organoaluminum oxy-compound (a), the transition metal compound (b-I) and the transition metal compound (b-II) are supported on the below-described carrier (c) can be used, instead.

(c) Carrier

The carrier optionally used in the invention is an inorganic or organic compound of granular or particulate solid having a particle diameter of 10 to 300 $\mu$m, preferably 20 to 200 $\mu$m. The inorganic carrier is preferably a porous oxide, and examples thereof include $SiO_2$, $Al_2O_3$, MgO, $ZrO_2$, $TiO_2$, $B_2O_3$, CaO, ZnO, BaO, $Tho_2$, and mixtures thereof such as $SiO_2$-MgO, $SiO_2$-$Al_2O_3$, $SiO_2$-$TiO_2$, $SiO_2$-$V_2O_5$, $SiO_2$-$Cr_2O_3$ and $SiO_2$-$TiO_2$-MgO. Of these, preferable are those containing $SiO_2$ and/or $Al_2O_3$ as their major component.

The above-mentioned inorganic oxides may contain small amounts of carbonate, sulfate, nitrate and oxide components, such as $Na_2CO_3$, $K_2CO_3$, $CaCO_3$, $MgCO_3$, $Na_2SO_4$, $Al_2(SO_4)_3$, $BaSO_4$, $KNO_3$, $Mg(NO_3)_2$, $Al(NO_3)_3$, $Na_2O$, $K_2O$ and $Li_2O$.

Although the properties of the carrier (c) vary depending upon the type and the preparation process, the carrier preferably used in the invention is desired to have a specific surface area of 50 to 1,000 $m^2$/g, preferably 100 to 700 $m^2$/g, and a pore volume of 0.3 to 2.5 $cm^3$/g. The carrier is used after calcined at a temperature of 100 to 1,000° C., preferably 150 to 700° C., if necessary.

It is desirable that the quantity of adsorption water in the carrier (c) is less than 1.0% by weight, preferably less than 0.5% by weight, and the quantity of surface hydroxyl group therein is not less than 1.0% by weight, preferably 1.5 to 4.0% by weight, particularly preferably 2.0 to 3.5% by weight.

The quantity of adsorption water (% by weight) and the quantity of surface hydroxyl group (% by weight) are determined in the following manner.

Quantity of Adsorption Water

Percentage of loss in weight of a carrier after drying at 200° C. for 4 hours at atmospheric pressure in a stream of nitrogen to the weight before drying is taken as the quantity of adsorption water.

Quantity of Surface Hydroxyl Group

The weight of a carrier obtained by drying at 200° C. for 4 hours in a stream of nitrogen is taken as X (g) and the weight of a calcined carrier obtained by calcining the carrier at 1,000° C. for 20 hours to remove the surface hydroxyl group is taken as Y (g), and the quantity of the surface hydroxyl group is calculated from the following formula.

Quantity of surface hydroxyl group (wt %)={(X−Y)/X}×100

Also employable as the carrier (c) in the invention is an organic compound of a granular or particulate solid having a particle diameter of 10 to 300 μm. Examples of such organic compounds include (co)polymers produced using an α-olefin of 2 to 14 carbon atoms such as ethylene, propylene, 1-butene or 4-methyl-1-pentene as a main component, and (co)polymers produced using vinylcyclohexane or styrene as a main component.

An organoaluminum compound (d) described below can by optionally used as a component for forming the olefin polymerization catalysts (Cat-1) and (Cat-2) for use in the invention.

(d) Organoaluminum Compound

The organoaluminum compound (d) (sometimes referred to as "component (d)" hereinafter) optionally used in the invention is, for example, an organoaluminum compound represented by the following formula (i):

  (i)

wherein $R^1$ is a hydrocarbon group of 1 to 12 carbon atoms, X is a halogen atom or a hydrogen atom, and n is 1 to 3.

In the formula (i), $R^1$ is a hydrocarbon group of 1 to 12 carbon atoms, e.g., an alkyl group, a cycloalkyl group or an aryl group. Examples of such groups include methyl, ethyl, n-propyl, isopropyl, isobutyl, pentyl, hexyl, octyl, cyclopentyl, cyclohexyl, phenyl and tolyl.

Examples of the organoaluminum compounds (d) include trialkylaluminums, such as trimethylaluminum, triethylaluminum, triisopropylaluminum, triisobutylaluminum, trioctylaluminum and tri-2-ethylhexylaluminum; alkenylaluminums, such as isoprenylaluminum; dialkylaluminum halides, such as dimethylaluminum chloride, diethylaluminum chloride, diisopropylaluminum chloride, diisobutylaluminum chloride and dimethylaluminum bromide; alkylaluminum sesquihalides, such as methylaluminum sesquichloride, ethylaluminum sesquichloride, isopropylaluminum sesquichloride, butylaluminum sesquichloride and ethylaluminum sesquibromide; alkylaluminum dihalides, such as methylaluminum dichloride, ethylaluminum dichloride, isopropylaluminum dichloride and ethylaluminum dibromide; and alkylaluminum hydrides, such as diethylaluminum hydride and diisobutylaluminum hydride.

Also employable as the organoaluminum compound (d) is a compound represented by the following formula (ii):

  (ii)

wherein $R^1$ is the same as above; Y is $-OR^2$ group, $-OSiR^3_3$ group, $-OAlR^4_2$ group, $-NR^5_2$ group, $-SiR^6_3$ group or $-N(R^7)AlR^8_2$ group; n is 1 to 2; $R^2$, $R^3$, $R^4$ and $R^8$ are each methyl, ethyl, isopropyl, isobutyl, cyclohexyl, phenyl or the like; $R^5$ is a hydrogen atom, methyl, ethyl, isopropyl, phenyl, trimethylsilyl or the like; and $R^6$ and $R^7$ are each methyl, ethyl or the like.

Examples of such organoaluminum compounds include:

(1) compounds of the formula $R^1_nAl(OR^2)_{3-n}$, e.g., dimethylaluminum methoxide, diethylaluminum ethoxide and diisobutylaluminum methoxide;

(2) compounds of the formula $R^1_nAl(OSiR^3_3)_{3-n}$, e.g., $Et_2Al(OSiMe_3)$, $(iso-Bu)_2Al(OSiMe_3)$ and $(iso-Bu)_2Al(OSiEt_3)$;

(3) compounds of the formula $R^1_nAl(OAlR^4_2)_{3-n}$, e.g., $Et_2AlOAlEt_2$ and $(iso-Bu)_2AlOAl(iso-Bu)_2$;

(4) compounds of the formula $R^1_nAl(NR^5_2)_{3-n}$, e.g., $Me_2AlNEt_2$, $Et_2AlNHMe$, $Me_2AlNHEt$, $Et_2AlN(SiMe_3)_2$ and $(iso-Bu)_2AlN(SiMe_3)_2$; and (5) compounds of the formula $R^1_nAl(SiR^6_3)_{3-n}$, e.g., $(iso-Bu)_2AlSiMe_3$; and (6) compounds of the formula $R^1_nAl(N(R^7)AlR^8_2)_{3-n}$, e.g., $Et_2AlN(Me)AlEt_2$ and $(iso-Bu)_2AlN(Et)Al(iso-Bu)_2$.

Of the organoaluminum compounds represented by the formulas (i) and (ii), preferable are compounds of the formulas $R^1_3Al$, $R^1_nAl(OR^2)_{3-n}$ and $R^1_nAl(OAlR^4_2)_{3-n}$, and particularly preferable are compounds of said formulas wherein $R^1$ is an isoalkyl group and n is 2.

The olefin polymerization catalyst (Cat-1) is formed from the component (a), the component (b), and if necessary, the component (d); and the olefin polymerization catalyst (Cat-2) (solid catalyst (Cat-2)) is formed from a solid catalyst (component) wherein the component (a) and the component (b) are supported on the component (c), and if necessary, the component (d).

In FIG. 1, steps for preparing the olefin polymerization catalyst (Cat-1) are shown.

The olefin polymerization catalyst (Cat-1) can be prepared by contacting the catalyst components with each other inside or outside the polymerization reactor. It is also possible that the component (a) previously made to be a solid component is contacted with the component (b) to form a solid catalyst or the component (a) is contacted with the component (b) to form a solid catalyst, and then the solid catalyst is added to the polymerization system.

The olefin polymerization catalyst (Cat-1) can be formed by contacting the component (a), the component (b), and if necessary, the component (d) in an inert hydrocarbon solvent. These catalyst components may be contacted in any order, but when the component (a) is contacted with the component (b), it is preferable to add the component (b) to a suspension of the component (a). The component (b) is preferably formed in advance by mixing two or more transition metal compounds (components (b-I) and (b-II)) and then contacted with other components.

Examples of the inert hydrocarbon solvents used for preparing the olefin polymerization catalyst (Cat-1) include aliphatic hydrocarbons, such as propane, butane, pentane, hexane, heptane, octane, decane, dodecane and kerosine; alicyclic hydrocarbons, such as cyclopentane, cyclohexane and methylcyclopentane; aromatic hydrocarbons, such as benzene, toluene and xylene; halogenated hydrocarbons, such as ethylene chloride, chlorobenzene and dichloromethane; and mixtures of these hydrocarbons.

In the contact between the component (a), the component (b), and if necessary, the component (d), the concentration of the component (a) is in the range of about 0.1 to 5 mol/liter-solvent, preferably 0.3 to 3 mol/liter-solvent, in terms of aluminum in the component (a). The atomic ratio of aluminum (Al) in the component (a) to the transition metal in the component (b) (Al/transition metal) is in the range of usually 10 to 500, preferably 20 to 200. The atomic ratio of an aluminum atom (Al-d) in the component (d) optionally used to an aluminum atom (Al-a) in the component (a) (Al-d/Al-a) is in the range of usually 0.02 to 3, preferably 0.05 to 1.5. In the contact of the component (a), the component (b), and if necessary, the component (d), the mixing temperature is in the range of usually −50 to 150° C., preferably −20 to 120° C., and the contact time is in the range of usually 1 minute to 50 hours, preferably 10 minutes to 25 hours.

In the olefin polymerization catalyst (Cat-1) prepared as above, the component (b) is desirably contained, based on 1 g of the catalyst, in an amount of $5 \times 10^{-6}$ to $5 \times 10^{-4}$ mol, preferably $10^{-5}$ to $2 \times 10^{-4}$ mol, in terms of the transition metal atom; and the component (a) and the component (d) are desirably contained, based on 1 g of the catalyst, in the total amount of $10^{-2}$ to $2.5 \times 10^{-2}$ mol, preferably $1.5 \times 10^{-2}$ to $2 \times 10^{-2}$ mol, in terms of an aluminum atom.

The solid catalyst (Cat-2) can be prepared by allowing the carrier (c) to support thereon the component (a), the component (b), and if necessary, the component (d).

Although the component (a), the component (b), the carrier (c), and if necessary, the component (d) may be contacted in any order to prepare the solid catalyst (Cat-2), it is preferable that the component (a) is contacted with the carrier (c), then with the component (b), and then, if necessary, with the component (d). The component (b) is preferably formed in advance by mixing two or more transition metal compounds (components (b-I) and (b-II)) and then contacted with other components.

The contact between the component (a), the component (b), the carrier (c) and component (d) can be conducted in an inert hydrocarbon solvent, and examples of the inert hydrocarbon solvents used for preparing the catalyst are the same as those used for preparing the olefin polymerization catalyst (Cat-1) previously described.

In the contact between the component (a), the component (b), the carrier (c), and if necessary, the component (d), the component (b) is used, based on 1 g of the carrier (c), in an amount of usually $5 \times 10^{-6}$ to $5 \times 10^{-4}$ mol, preferably $10^{-5}$ to $2 \times 10^{-4}$ mol, in terms of the transition metal atom; and the concentration of the component (b) is in the range of about $10^{-4}$ to $2 \times 10^{-2}$ mol/liter-solvent, preferably $2 \times 10^{-4}$ to $10^{-2}$ mol/liter-solvent, in terms of the transition metal atom. The atomic ratio of aluminum (Al) in the component (a) to the transition metal in the component (b) (Al/transition metal) is in the range of usually 10 to 500, preferably 20 to 200. The atomic ratio of an aluminum atom (Al-d) in the component (d) optionally used to an aluminum atom (Al-a) in the component (a) (Al-d/Al-a) is in the range of usually 0.02 to 3, preferably 0.05 to 1.5. In the contact between the component (a), the component (b), the carrier (c), and if necessary, the component (d), the mixing temperature is in the range of usually −50 to 150° C., preferably −20 to 120° C., and the contact time is in the range of usually 1 minute to 50 hours, preferably 10 minutes to 25 hours.

In the solid catalyst (Cat-2) prepared as above, the component (b) is desirably supported, based on 1 g of the carrier (c), in an amount of $5 \times 10^{-6}$ to $5 \times 10^{-4}$ mol, preferably $10^{-5}$ to $2 \times 10^{-4}$ mol, in terms of the transition metal atom; and the component (a) and the component (d) are desirably supported, based on 1 g of the carrier (c), in the total amount of $10^{-3}$ to $5 \times 10^{-2}$ mol, preferably $2 \times 10^{-3}$ to $2 \times 10^{-2}$ mol, in terms of an aluminum atom.

The olefin polymerization catalyst (Cat-2) may be a prepolymerized catalyst in which an olefin has been prepolymerized.

The prepolymerized catalyst can be prepared by introducing an olefin into an inert hydrocarbon solvent in the presence of the component (a), the component (b) and the carrier (c) to preform prepolymerization. It is preferable that the solid catalyst component (Cat-2) is formed from the component (a), the component (b) and the carrier (c). The solid catalyst component (Cat-2) may be further blended with the component (a) and/or the component (d).

For preparing the prepolymerized catalyst, it is feasible that an olefin is added to a suspension containing the produced solid catalyst (Cat-2) (solid catalyst component), or it is feasible that from a suspension containing the produced solid catalyst (Cat-2), the solid catalyst (Cat-2) is separated, then the solid catalyst is resuspended in an inert hydrocarbon, and an olefin is added to the resulting suspension.

In the preparation of the prepolymerized catalyst, the component (b) is used in an amount of usually $10^{-6}$ to $2 \times 10^{-2}$ mol/liter-solvent, preferably $5 \times 10^{-5}$ to $10^{-2}$ mol/liter-solvent, in terms of the transition metal atom in the component (b); and the component (b) is used, based on 1 g of the carrier (c), in an amount of $5 \times 10^{-6}$ to $5 \times 10^{-4}$ mol, preferably $10^{-5}$ to $2 \times 10^{-4}$ mol, in terms of the transition metal atom in the component (b). The atomic ratio of aluminum (Al) in the component (a) to the transition metal in the component (b) (Al/transition metal) is in the range of usually 10 to 500, preferably 20 to 200. The atomic ratio of an aluminum atom (Al-d) in the component (d) optionally used to an aluminum atom (Al-a) in the component (a) (Al-d/Al-a) is in the range of usually 0.02 to 3, preferably 0.05 to 1.5.

The solid catalyst component is used in an amount of usually $10^{-6}$ to $2 \times 10^{-2}$ mol/liter-solvent, preferably $5 \times 10^{-5}$ to $10^{-2}$ mol/liter-solvent, in terms of the transition metal in the transition metal compound.

The prepolymerization temperature is in the range of usually −20 to 80° C., preferably 0 to 60° C., and the prepolymerization time is in the range of usually 0.5 to 200 hours, preferably 2 to 50 hours.

Examples of the olefins used in the prepolymerization include ethylene; and α-olefins of 3 to 20 carbon atoms, such as propylene, 1-butene, 1-pentene, 4-methyl-1-pentene, 1-hexene, 1-octene, 1-decene, 1-dodecene and 1-tetradecene. Of these, particularly preferable is ethylene or a combination of ethylene and the same α-olefin as used in the polymerization.

The prepolymerized catalyst is prepared by, for example, the following process. The carrier is suspended in an inert hydrocarbon to give a suspension. To the suspension, the organoaluminum oxy-compound (component (a)) is added, and they are reacted for a given period of time. Then, the supernatant liquid is removed, and the resulting solid is resuspended in an inert hydrocarbon. To the system, the transition metal compound (component (b)) is added, and they are reacted for a given period of time. Then, the supernatant liquid is removed to obtain a solid catalyst component. Subsequently, to an inert hydrocarbon containing the organoaluminum compound (component (d)), the solid catalyst component is added and an olefin is further introduced. Thus, a prepolymerized catalyst is obtained.

In the prepolymerization, an olefin polymer is desirably produced in an amount of 0.1 to 500 g, preferably 0.2 to 300 g, more preferably 0.5 to 200 g, based on 1 g of the carrier (c).

In the prepolymerized catalyst, the component (b) is desirably supported, based on 1 g of the carrier (c), in an amount of $5 \times 10^{-6}$ to $5 \times 10^{-4}$ mol, preferably $10^{-5}$ to $2 \times 10^{-4}$ mol, in terms of the transition metal atom; and the component (a) and the component (d) are desirably supported in such amounts that the molar ratio of an aluminum atom (Al) in the components (a) and (d) to the transition metal atom (M) in the component (b) (Al/M) becomes 5 to 200, preferably 10 to 150.

The prepolymerization can be carried out by any of batchwise and continuous processes, and can be carried out under reduced pressure, at atmospheric pressure or under pressure. In the prepolymerization, hydrogen is desirably allowed to be present in the system to produce a prepolymer having an intrinsic viscosity (η), as measured in decalin at 135° C., of 0.2 to 7 dl/g, preferably 0.5 to 5 dl/g.

In the present invention, copolymerization of ethylene and an α-olefin is carried out in the presence of the above-mentioned olefin polymerization catalyst in a gas phase or a liquid phase of slurry, preferably in a gas phase. In the slurry polymerization, an inert hydrocarbon may be used as the solvent, or the olefin itself may be used as the solvent.

Examples of the inert hydrocarbon solvents used in the slurry polymerization include aliphatic hydrocarbons, such as propane, butane, isobutane, pentane, hexane, octane, decane, dodecane, hexadecane and octadecane; alicyclic hydrocarbons, such as cyclopentane, methylcyclopentane, cyclohexane and cyclooctane; aromatic hydrocarbons, such as benzene, toluene and xylene; and petroleum fractions, such as gasoline, kerosine and gas oil. Of the inert hydrocarbon solvents, preferable are aliphatic hydrocarbons, alicyclic hydrocarbons and petroleum fractions.

When the copolymerization is carried out as slurry polymerization or gas phase polymerization, the catalyst is desirably used in an amount of usually $10^{-8}$ to $10^{-3}$ mol/liter, preferably $10^{-7}$ to $10^{-4}$ mol/liter, in terms of a concentration of the transition metal atom in the polymerization reaction system.

In the olefin polymerization catalyst formed from the component (a), the component (b) and optionally the component (d), the atomic ratio of an aluminum atom (Al) in the component (d) to the transition metal atom (M) in the transition metal compound (b) (Al/M) is in the range of 5 to 300, preferably 10 to 200, more preferably 15 to 150.

In the polymerization using the olefin polymerization catalyst formed from the component (a), the component (b), the carrier (c) and optionally the component (d), an organoaluminum oxy-compound which is not supported on the carrier may be used in addition to the organoaluminum oxy-compound (component (a)) which is supported on the carrier. In this case, the atomic ratio of an aluminum atom (Al) in the organoaluminum oxy-compound which is not supported on the carrier to the transition metal atom (M) in the transition metal compound (b) (Al/M) is in the range of 5 to 300, preferably 10 to 200, more preferably 15 to 150. The component (d) optionally used may be supported on the carrier (c). The component (d) may be added during the polymerization. It is also possible that the component (d) having been beforehand supported on the carrier may be added during the polymerization. The component (d) having been supported on the carrier and the component (d) to be added during the polymerization may be the same or different. The atomic ratio of an aluminum atom (Al) in the component (d) optionally used to the transition metal atom (M) in the transition metal compound (b) (Al/M) is in the range of 5 to 300, preferably 10 to 200, more preferably 15 to 150.

When the slurry polymerization is carried out in the invention, the polymerization temperature is in the range of usually −50 to 100° C., preferably 0 to 90° C. When the gas phase polymerization is carried out, the polymerization temperature is in the range of usually 0 to 120° C., preferably 20 to 100° C.

The polymerization pressure is usually atmospheric pressure to 100 kg/cm$^2$, preferably 2 to 50 kg/cm$^2$. The polymerization can be carried out by any of batchwise, semi-continuous and continuous processes.

The polymerization can be conducted in two or more stages under different reaction conditions. In the olefin polymerization catalyst used in the invention, other components useful for olefin polymerization may be further contained in addition to the above components.

Examples of the olefins which can be polymerized by the use of the olefin polymerization catalyst include ethylene; the aforesaid α-olefins of 6 to 8 carbon atoms; other α-olefins, such as propylene, 1-butene, 1-pentene, 4-methyl-1-pentene, 1-decene, 1-dodecene, 1-tetradecene, 1-hexadecene and 1-octadecene and 1-eicosene; and cyclic olefins of 3 to 20 carbon atoms, such as cyclopentene, cycloheptene, norbornene, 5-methyl-2-norbornene, tetracyclododecene and 2-methyl-1,4,5,8-dimethano-1,2,3,4,4a,5,8,8a-octahydronaphthalene. Also employable are styrene, vinylcyclohexane and dienes.

In the ethylene/α-olefin copolymer of the invention obtained by the olefin polymerization process, it is desired that the constituent units derived from ethylene are present in amounts of 50 to 100% by weight, preferably 55 to 99% by weight, more preferably 65 to 98% by weight, most preferably 70 to 96% by weight, and the constituent units derived from the α-olefin of 6 to 8 carbon atoms are present in amounts of 0 to 50% by weight, preferably 1 to 45% by weight, more preferably 2 to 35% by weight, most preferably 4 to 30% by weight.

The ethylene/α-olefin copolymer thus obtained preferably exhibits the aforesaid properties (A-i) to (A-iii), so that it has excellent moldability and can produce films of excellent transparency and mechanical strength.

Ethylene Copolymer Composition (A')

The ethylene copolymer composition (A') has substantially the same content and usefulness as those of the ethylene/α-olefin copolymer (A), and comprises (B) an ethylene/α-olefin copolymer and (C) an ethylene/α-olefin copolymer which is different from the copolymer (B).

The ethylene/α-olefin copolymer (B) is a random copolymer of ethylene and an α-olefin of 6 to 8 carbon atoms. Examples of the α-olefins of 6 to 8 carbon atoms include the same olefins as previously described.

In the ethylene/α-olefin copolymer (B), it is desired that the constituent units derived from ethylene are present in amounts of 50 to 100% by weight, preferably 55 to 99% by weight, more preferably 65 to 98% by weight, most preferably 70 to 96% by weight, and the constituent units derived from the α-olefin of 6 to 8 carbon atoms are present in amounts of 0 to 50% by weight, preferably 1 to 45% by weight, more preferably 2 to 35% by weight, particularly preferably 4 to 30% by weight.

The ethylene/α-olefin copolymer (B) preferably has the following properties (B-i) to (B-vii) and particularly preferably has the following properties (B-i) to (B-viii).

(B-i) The density (d) is in the range of 0.880 to 0.970 g/cm$^3$, preferably 0.880 to 0.960 g/cm$^3$, more preferably 0.890 to 0.935 g/cm$^3$, most preferably 0.905 to 0.930 g/cm$^3$.

(B-ii) The melt flow rate (MFR) is in the range of 0.02 to 200 g/10 min, preferably 0.05 to 50 g/10 min, more preferably 0.1 to 10 g/10 min.

(B-iii) The decane-soluble component fraction (W (wt %)) at 23° C. and the density (d (g/cm$^3$)) satisfy the following relation in case of MFR≦10 g/10 min, $$W<80\times\exp(-100(d-0.88))+0.1,$$

preferably $W<60\times\exp(-100(d-0.88))+0.1$,
more preferably $W<40\times\exp(-100(d-0.88))+0.1$,
in case of MFR>10 g/10 min, $$W<80\times(MFR-9)^{0.26}\times\exp(-100(d-0.88))+0.1.$$

(B-iv) The temperature (Tm (° C.)) at the maximum peak position of an endothermic curve of the copolymer as measured by a differential scanning calorimeter (DSC) and the density (d (g/cm$^3$)) satisfy the following relation $$Tm<400\times d-248,$$

preferably $Tm<450\times d-296$,
more preferably $Tm<500\times d-343$,
particularly preferably $Tm<550\times d-392$.

The ethylene/α-olefin copolymer (B) having the above-defined relation between the temperature (Tm) at the maximum peak position of an endothermic curve as measured by a differential scanning calorimeter (DSC) and the density (d)

and having the above-defined relation between the n-decane-soluble component fraction (W) and the density (d) shows a narrow composition distribution.

(B-v) The melt tension (MT (g)) and the melt flow rate (MFR (g/10 min)) satisfy the following relation $$9.0 \times MFR^{-0.65} > MT > 2.2 \times MFR^{-0.84},$$

preferably $9.0 \times MFR^{-0.65} > MT > 2.3 \times MFR^{-0.84}$, more preferably $8.5 \times MFR^{-0.65} > MT > 2.5 \times MFR^{-0.84}$.

The ethylene/α-olefin copolymer having the above property shows high melt tension (MT), so that it has excellent moldability.

(B-vi) The flow activation energy $((E_a) \times 10^{-4}$ J/molK) determined from a shift factor of time-temperature superposition of the flow curve, the carbon atom number (C) of the α-olefin in the copolymer and the α-olefin content (x mol %) in the copolymer satisfy the following relation $$(0.039Ln(C-2)+0.0096) \times x+2.87 < (E_a) \times 10^{-4} \leq (0.039Ln(C-2)+0.1660) \times x+2.87,$$

preferably $$(0.039Ln(C-2)+0.0096) \times x+2.87 < (E_a) \times 10^{-4} \leq (0.039Ln(C-2)+0.1500) \times x+2.87,$$

more preferably $$(0.039Ln(C-2)+0.0096) \times x+2.87 < (E_a) \times 10^{-4} \leq (0.039Ln(C-2)+0.1300) \times x+2.87.$$

(B-vii) The molecular weight distribution (Mw/Mn, Mw: weight-average molecular weight, Mn: number-average molecular weight), as determined by GPC, satisfies the following condition 2.2<Mw/Mn<3.5, preferably 2.4<Mw/Mn<3.0.

The molecular weight distribution (Mw/Mn) was measured by the following manner using GPC-150C manufactured by Milipore Co.

A column of TSK-GNH-HT having a diameter of 72 mm and a length of 600 mm was used, and the column temperature was 140° C. In the column, 500 microliters of a sample (concentration: 0.1% by weight) was moved using o-dichlorobenzene (available from Wako Junyaku Kogyo K.K.) as a mobile phase and 0.025% by weight of BHT (available from Takeda Chemical Industries, Ltd.) as an antioxidant. As a detector, a differential refractometer was used. As standard polystyrene, polystyrenes of Mw<1,000 and Mw>4×10⁶ available from TOHSO K.K. and polystyrene of 1,000<Mw≦4×10⁶ available from Pressure Chemical Co. were used.

(B-viii) The number of unsaturated bonds present in the molecules of the copolymer is not more than 0.5 based on 1,000 carbon atoms and is less than 1 based on one molecule of the copolymer.

The quantitative determination of the unsaturated bonds is made by finding an area intensity of signals not assigned to double bonds, i.e., signals within the range of 10 to 50 ppm, and an area intensity of signals assigned to double bonds, i.e., signals within the range of 105 to 150 ppm, from the integration curve using $^{13}$C-NMR and calculating a ratio between the intensities.

The ethylene/α-olefin copolymer (B) can be obtained by copolymerizing ethylene and an α-olefin of 6 to 8 carbon atoms in the presence of an olefin polymerization catalyst comprising, for example, (a) an organoaluminum oxy-compound and (b-II) a transition metal compound represented by the aforesaid formula (II). The organoaluminum oxy-compound (a) and the transition metal compound (b-II) are the same as those previously described in the process for preparing the ethylene/α-olefin copolymer (A). Similarly to the preparation of ethylene/α-olefin copolymer (A), the carrier (c) and the organoaluminum compound (d) may be also employed, and prepolymerization may be conducted. The amounts of the components, prepolymerization conditions and polymerization conditions for preparing the ethylene/α-olefin copolymer (B) are the same as those for preparing the ethylene/α-olefin copolymer (A).

The ethylene/α-olefin copolymer (C) is a random copolymer of ethylene and an α-olefin of 6 to 8 carbon atoms. Examples of the α-olefins of 6 to 8 include the same olefins as described above.

In the ethylene/α-olefin copolymer (C) for use in the invention, it is desired that the constituent units derived from ethylene are present in amounts of 50 to 100% by weight, preferably 55 to 99% by weight, more preferably 65 to 98% by weight, most preferably 70 to 96% by weight, and the constituent units derived from the α-olefin of 6 to 8 carbon atoms are present in amounts of 0 to 50% by weight, preferably 1 to 45% by weight, more preferably 2 to 35% by weight, particularly preferably 4 to 30% by weight.

The ethylene/α-olefin copolymer (C) preferably has the following properties (C-i) to (C-v) and particularly preferably has the following properties (C-i) to (C-vi).

(C-i) The density (d) is in the range of 0.880 to 0.970 g/cm³, preferably 0.880 to 0.960 g/cm³, more preferably 0.890 to 0.935 g/cm³, most preferably 0.905 to 0.930 g/cm³.

(C-ii) The melt flow rate (MFR) is in the range of 0.02 to 200 g/10 min, preferably 0.05 to 50 g/10 min, more preferably 0.1 to 10 g/10 min.

(C-iii) The decane-soluble component fraction (W (wt %)) at 23° C. and the density (d (g/cm³)) satisfy the following relation in case of MFR≦10 g/10 min, $$W < 80 \times \exp(-100(d-0.88)) + 0.1,$$

preferably $W < 60 \times \exp(-100(d-0.88)) + 0.1$, more preferably $W < 40 \times \exp(-100(d-0.88)) + 0.1$, in case of MFR>10 g/10 min, $$W < 80 \times (MFR-9)^{0.26} \times \exp(-100(d-0.88)) + 0.1.$$

(C-iv) The temperature (Tm (° C.)) at the maximum peak position of an endothermic curve of the copolymer as measured by a differential scanning calorimeter (DSC) and the density (d (g/cm³)) satisfy the following relation $$Tm < 400 \times d - 248,$$

preferably Tm<450×d−296, more preferably Tm<500×d−343, particularly preferably Tm<550×d−392.

The ethylene/α-olefin copolymer (C) having the above-defined relation between the temperature (Tm) at the maximum peak position of an endothermic curve as measured by a differential scanning calorimeter (DSC) and the density (d) and having the above-defined relation between the n-decane-soluble component fraction (W) and the density (d) shows a narrow composition distribution.

(C-v) The melt tension (MT (g)) and the melt flow rate (MFR (g/10 min)) satisfy the following relation $$MT \leq 2.2 \times MFR^{-0.84}.$$

(C-vi) The number of unsaturated bonds present in the molecules of the copolymer is not more than 0.5 based on 1,000 carbon atoms and is less than 1 based on one molecule of the copolymer.

The ethylene/α-olefin copolymer (C) can be obtained by copolymerizing ethylene and an α-olefin of 6 to 8 carbon atoms in the presence of an olefin polymerization catalyst comprising, for example, (a) an organoaluminum oxy-compound and (b-I) a transition metal compound represented by the aforesaid formula (I). The organoaluminum oxy-compound (a) and the transition metal compound (b-I) are the same as those previously described in the process for preparing the ethylene/α-olefin copolymer (A). Similarly to the preparation of the ethylene/α-olefin copolymer (A), the carrier (c) and the organoaluminum compound (d) may be employed, and prepolymerization may be conducted. The amounts of the components, prepolymerization conditions and polymerization conditions for preparing the ethylene/α-olefin copolymer (C) are the same as those for preparing the ethylene/α-olefin copolymer (A).

In the ethylene copolymer composition (A') of the invention, it is desired that the ethylene/α-olefin copolymer (B) is contained in an amount of 1 to 90% by weight, preferably 2 to 80% by weight, and the ethylene/α-olefin copolymer (C) is contained in an amount of 10 to 99% by weight, preferably 20 to 98% by weight.

In the ethylene copolymer composition (A') comprising the ethylene/α-olefin copolymer (B) and the ethylene/α-olefin copolymer (C), the ratio of the melt flow rate (MFR (C)) of the ethylene/α-olefin copolymer (C) to the melt flow rate (MFR(B)) of the ethylene/α-olefin copolymer (B) satisfies the following condition:

$$1<(MFR(C))/(MFR(B))\leq 20.$$

In the ethylene copolymer composition (A'), the ethylene/α-olefin copolymers (B) and (C) are both desirably ethylene/1-hexene copolymers. In this case, the ethylene copolymer composition (A') has substantially the same properties as those of the ethylene/α-olefin copolymer (A) as described below, and can be expected to exhibit usefulness similar to that of the copolymer (A).

(A'-i) The melt tension (MT (g)) and the melt flow rate (MFR (g/10 min)) satisfy the following relation $$9.0 \times MFR^{-0.65} > MT > 2.2 \times MFR^{-0.84},$$

preferably $9.0 \times MFR^{-0.65} > MT > 2.3 \times MFR^{-0.84}$,
more preferably $8.5 \times MFR^{-0.65} > MT > 2.5 \times MFR^{-0.84}$.

The ethylene copolymer composition (A') having the above property shows high melt tension, so that it has excellent moldability.

(A'-ii) The flow activation energy (($E_a$)×10$^{-4}$ J/molK) determined from a shift factor of time temperature superposition of the flow curve, the carbon atom number (C) of 1-hexene in the copolymers (B) and (C), and the total content (x mol %) of 1-hexene in the copolymers (B) and (C) satisfy the following relation $$(0.039Ln(C-2)+0.0096)\times x+2.87<(E_a)\times 10^{-4}\leq (0.039Ln(C-2)+0.1660)\times x+2.87,$$

preferably $$(0.039Ln(C-2)+0.0096)\times x+2.87<(E_a)\times 10^{-4}\leq (0.039Ln(C-2)+0.1500)\times x+2.87,$$

more preferably $$(0.039Ln(C-2)+0.0096)\times x+2.87<(E_a)\times 10^{-4}\leq (0.039Ln(C-2)+0.1300)\times x+2.87.$$

(A'-iii) The haze of a film having a thickness of 30 μm produced from the ethylene copolymer composition (A') by inflation molding satisfies the following conditions:

where the flow index (FI) defined as a shear rate which is given when the shear stress reaches 2.4×10$^6$ dyne/cm$^2$ at 190° C. and the melt flow rate (MFR) satisfy the relation FI≧100×MFR, $$Haze<0.45/(1-d)\times \log(3\times MT^{1.4})\times (C-3)^{0.1},$$

and where the flow index (FI) defined as a shear rate which is given when the shear stress reaches 2.4×10$^6$ dyne/cm$^2$ at 190° C. and the melt flow rate (MFR) satisfy the relation FI<100×MFR, $$Haze<0.25/(1-d)\times \log(3\times MT^{1.4})\times (C-3)^{0.1},$$

wherein d represents density (g/cm$^3$), MT represents melt tension (g), and C represents the carbon atom number of 1-hexene, namely, 6.

The ethylene copolymer composition (A') satisfying the above conditions has excellent moldability and is capable of producing films of excellent transparency.

The ethylene copolymer composition (A') of the invention preferably further has the following property in addition to the above properties (A'-iv) The molecular weight distribution (Mw/Mn, Mw: weight-average molecular weight, Mn: number-average molecular weight), as determined by GPC, satisfies the following condition:

$$2.0\leq Mw/Mn\leq 2.5,$$

preferably $2.0\leq Mw/Mn\leq 2.4$.

In the ethylene copolymer composition (A') according to the invention, it is desired that the constituent units derived from ethylene are present in amounts of 50 to 100% by weight, preferably 55 to 99% by weight, more preferably 65 to 98% by weight, most preferably 70 to 96% by weight, and the constituent units derived from the α-olefin of 6 to 8 carbon atoms, preferably 1-hexene, are present in amounts of 0 to 50% by weight, preferably 1 to 45% by weight, more preferably 2 to 35% by weight, particularly preferably 4 to 30% by weight.

The ethylene copolymer composition (A') desirably has a density (d) of 0.880 to 0.970 g/cm$^3$, preferably 0.880 to 0.960 g/cm$^3$, more preferably 0.890 to 0.935 g/cm$^3$, most preferably 0.905 to 0.930 g/cm$^3$.

The ethylene copolymer composition (A') desirably has a melt flow rate (MFR) of 0.05 to 200 g/10 min, preferably 0.08 to 50 g/10 min, more preferably 0.1 to 10 g/10 min.

The n-decane-soluble component fraction (W (wt %)) of the ethylene copolymer composition (A') at 23° C. and the density (d (g/cm$^3$)) thereof satisfy the following relation
in case of MFR≦10 g/10 min, $$W<80\times \exp(-100(d-0.88))+0.1,$$

preferably $W<60\times \exp(-100(d-0.88))+0.1$,
more preferably $W<40\times \exp(-100(d-0.88))+0.1$,
in case of MFR>10 g/10 min, $$W<80\times (MFR-9)^{0.26}\times \exp(-100(d-0.88))+0.1.$$

The temperature (Tm (° C.)) at the maximum peak position of an endothermic curve of the ethylene copolymer composition (A') as measured by a differential scanning calorimeter (DSC) and the density (d (g/cm$^3$)) thereof satisfy the following relation
Tm<400×d−248,
preferably Tm<450×d−296,
more preferably Tm<500×d−343,
particularly preferably Tm<550×d−392.

The ethylene copolymer composition (A') having the above-defined relation between the temperature (Tm) at the maximum peak position of an endothermic curve as measured by a differential scanning calorimeter (DSC) and the density (d) and having the above-defined relation between the n-decane-soluble component fraction (W) and the density (d) shows a narrow composition distribution.

The ethylene copolymer composition (A') comprising the ethylene/α-olefin copolymer (B) and the ethylene/α-olefin copolymer (C) can be prepared by conventional processes, for example, the following processes.

(1) The ethylene/α-olefin copolymer (B), the ethylene/α-olefin copolymer (C) and other components optionally added are mechanically blended or melt mixed using a tumbler, an extruder, a kneader or the like.

(2) The ethylene/α-olefin copolymer (B), the ethylene/α-olefin copolymer (C) and other components optionally added are dissolved in an appropriate good solvent (e.g., hydrocarbon solvents such as hexane, heptane, decane, cyclohexane, benzene, toluene and xylene), and the solvent is then removed from the solution.

(3) The ethylene/α-olefin copolymer (B), the ethylene/α-olefin copolymer (C) and other components optionally added are individually dissolved in a good solvent, the solutions are mixed, and the solvents are removed from the mixture.

(4) The processes (1) to (3) are properly combined.

The ethylene/α-olefin copolymer (A) and the ethylene copolymer composition (A') of the invention described above both have excellent moldability and are capable of producing films of excellent transparency and mechanical strength, as they are, but they can be used in combination with other polymers, preferably an ethylene/α-olefin copolymer. As such an ethylene/α-olefin copolymer, the below-described ethylene/α-olefin copolymer (D) is particularly preferably employed.

The ethylene/α-olefin copolymer (D) is a random copolymer of ethylene and an α-olefin of 3 to 20 carbon atoms. Examples of the α-olefins of 3 to 20 carbon atoms include propylene, 1-butene, 1-pentene, 1-hexene, 4-methyl-1-pentene, 1-octene, 1-decene, 1-dodecene, 1-tetradecene, 1-hexadecene, 1-octadecene and 1-eicosene.

In the ethylene/α-olefin copolymer (D), it is desired that the constituent units derived from ethylene are present in amounts of 50 to 100% by weight, preferably 55 to 99% by weight, more preferably 65 to 98% by weight, most preferably 70 to 96% by weight, and the constituent units derived from the α-olefin of 3 to 20 carbon atoms are present in amounts of 0 to 50% by weight, preferably 1 to 45% by weight, more preferably 2 to 35% by weight, most preferably 4 to 30% by weight.

The ethylene/α-olefin copolymer (D) preferably has the following properties (D-i) to (D-ii) and particularly preferably has the following properties (D-i) to (D-iv).

(D-i) The density (d) is in the range of 0.850 to 0.980 g/cm$^3$, preferably 0.910 to 0.960 g/cm$^3$, more preferably 0.915 to 0.955 g/cm$^3$, most preferably 0.920 to 0.950 g/cm$^3$.

(D-ii) The intrinsic viscosity (η) as measured in decalin at 135° C. is in the range of 0.4 to 8 dl/g, preferably 0.4 to 1.25 dl/g, more preferably 0.5 to 1.23 dl/g.

(D-iii) The temperature (Tm (° C.)) at the maximum peak position of an endothermic curve of the copolymer as measured by a differential scanning calorimeter (DSC) and the density (d (g/cm$^3$)) satisfy the following relation Tm<400×d−250, preferably Tm<450×d−297, more preferably Tm<500×d−344, particularly preferably Tm<550×d−391.

(D-iv) The n-decane-soluble component fraction (W (wt %)) at room temperature and the density (d (g/cm$^3$)) satisfy the following relation in case of MFR≦10 g/10 min, W<80×exp(−100(d−0.88))+0.1, preferably W<60×exp(−100(d−0.88))+0.1,
more preferably W<40×exp(−100(d−0.88))+0.1, in case of MFR>10 g/10 min, W<80×(MFR-9)$^{0.26}$×exp(−100(d−0.88))+0.1.

The ethylene/α-olefin copolymer (D) having the above-defined relation between the temperature (Tm) at the maximum peak position of an endothermic curve as measured by a differential scanning calorimeter (DSC) and the density (d) and having the above-defined relation between the n-decane-soluble component fraction (W) and the density (d) shows a narrow composition distribution.

The ethylene/α-olefin copolymer (A) is not identical with the ethylene/α-olefin copolymer (D); and each of the ethylene/α-olefin copolymers (B) and (C) is not identical with the ethylene/α-olefin copolymer (D). Specifically, the ethylene/α-olefin copolymer (D) can be differentiated from the ethylene/α-olefin copolymers (A) to (C) in the following properties.

The copolymer (D) can be differentiated from the copolymer (A) regarding that the copolymer (D) does not satisfy at least one of properties (A-i) to (A-iii) required for the copolymer (A). The copolymer (B) can be differentiated from the copolymer (D) in the fact that the copolymer (D) does not satisfy at least one of (B-iii) to (B-vii) for the copolymer (B). Further, the copolymer (D) does not satisfy at least one of (C-iii) to (C-v) required for the copolymer (C).

The ethylene/α-olefin copolymer (D) can be prepared by copolymerizing ethylene and an α-olefin of 3 to 20 carbon atoms in the presence of an olefin polymerization catalyst comprising, for example, (a) an organoaluminum compound and (b-III) the below-described transition metal compound represented by the formula (III). The organoaluminum oxy-compound (a) is the same as that previously described in the process for preparing the ethylene/α-olefin copolymer (A). Similarly to the preparation of ethylene/α-olefin copolymer (A), the carrier (c) and the organoaluminum compound (d) may be employed, and prepolymerization may be conducted. The amounts of the components, prepolymerization conditions and polymerization conditions for preparing the ethylene/α-olefin copolymer (D) are the same as those for preparing the ethylene/α-olefin copolymer (A).

The transition metal compound (b-III) is described below.

(b-III) Transition Metal Compound

The transition metal compound (b-III) (sometimes referred to as "component (b-III)" hereinafter) used for preparing the ethylene/α-olefin copolymer (D) is a compound of a transition metal of Group 4 of the periodic table containing a ligand having cyclopentadienyl skeleton. As the transition metal compound (b-III), any compound can be used without specific limitation, as far as it is a compound of a transition metal of Group 4 of the periodic table containing a ligand having cyclopentadienyl skeleton. The transition metal compound (b-III), however, is preferably a compound represented by the following formula (III).

$ML^3_x$ (III)

In the formula (III), M is a transition metal atom selected from Group 4 of the periodic table, specifically zirconium, titanium or hafnium, preferably zirconium.

x is a valence of the transition metal.

$L^3$ is a ligand coordinated to the transition metal atom M, and at least one ligand $L^3$ is a ligand having cyclopentadienyl skeleton. Examples of the ligands having cyclopentadienyl skeleton include a cyclopentadienyl group; alkyl-substituted cyclopentadienyl groups, such as a methylcyclopentadienyl group, a dimethylcyclopentadienyl group, a trimethylcyclopentadienyl group, a tetramethylcyclopentadienyl group, a pentamethylcyclopentadienyl group, an ethylcyclopentadienyl group, a methylethylcyclopentadienyl group, a propylcyclopentadienyl group, a methylpropylcyclopentadienyl group, a butylcyclopentadienyl group, a methylbutylcyclopentadienyl group and a hexylcyclopentadienyl group; an indenyl group; a 4,5,6,7-tetrahydroindenyl group; and a fluorenyl group. These groups may be substituted with halogen atoms, trialkylsilyl groups and the like.

Of the ligands having cyclopentadienyl skeleton, particularly preferable are alkyl-substituted cyclopentadienyl groups.

When the compound represented by the formula (III) contains two or more ligands having cyclopentadienyl skeleton, two of them may be bonded through an alkylene group such as ethylene or propylene, an alkyl-substituted alkylene group such as isopropylidene or diphenylmethylene, a silylene group, or a substituted silylene group such as dimethylsilylene, diphenylsilylene or methylphenylsilylene.

In the formula (III), $L^3$ other than the ligand having cyclopentadienyl skeleton is a hydrocarbon group of 1 to 12 carbon atoms, an alkoxy group, an aryloxy group, a trialkylsilyl group, a halogen atom or a hydrogen atom, each of which is the same group or atom as indicated by $L^1$ in the aforesaid formula (I), or a $SO^3R$ group (R is a hydrocarbon group of 1 to 8 carbon atoms which may have a substituent such as halogen). Examples of the ligands represented by $SO_3R$ include a p-toluenesulfonato group, a methanesulfonato group and a trifluoromethanesulfonato group.

The transition metal compound of the formula (III) wherein the valence of the transition metal is, for example, 4 is more specifically represented by the following formula (III'):

$$R^2{}_k R^3{}_l R^4{}_m R^5{}_n M \qquad (III')$$

wherein M is the same transition metal atom as described above; $R^2$ is a group (ligand) having cyclopentadienyl skeleton; $R^3$, $R^4$ and $R^5$ are each a group having cyclopentadienyl skeleton, an alkyl group, a cycloalkyl group, an aryl group, an aralkyl group, an alkoxy group, an aryloxy group, a trialkylsilyl group, a $SO_3R$ group, a halogen atom or a hydrogen atom; k is an integer of 1 or more; and k+l+m+n=4.

In the present invention, a metallocene compound wherein one of $R^3$, $R^4$ and $R^5$ is a group (ligand) having cyclopentadienyl skeleton, e.g., a metallocene compound wherein $R^2$ and $R^3$ are each a group (ligand) having cyclopentadienyl skeleton, is preferably employed. The groups having cyclopentadienyl skeleton may be bonded through an alkylene group such as ethylene or propylene, substituted alkylene group such as isopropylidene or iphenylmethylene, a silylene group, or a substituted silylene group such as dimethylsilylene, diphenylsilylene or methylphenylsilylene. In this case, other ligands (e.g., $R^4$ and $R^5$) are each a group having cyclopentadienyl skeleton, an alkyl group, a cycloalkyl group, an aryl group, an aralkyl group, an alkoxy group, an aryloxy group, a trialkylsilyl group, a $SO_3R$ group, a halogen atom or a hydrogen atom.

Examples of the transition metal compounds represented by the formula (III) include bis(indenyl)zirconium dichloride, bis(indenyl)zirconium dibromide, bis(indenyl) zirconiumbis(p-toluenesulfonato), bis(4,5,6,7-tetrahydroindenyl)zirconium dichloride, bis(fluorenyl) zirconium dichloride, ethylenebis(indenyl)zirconium dichloride, ethylenebis(indenyl)zirconium dibromide, ethylenebis(indenyl)dimethylzirconium, ethylenebis (indenyl)diphenylzirconium, ethylenebis(indenyl) methylzirconium monochloride, ethylenebis(indenyl) zirconiumbis(methanesulfonato), ethylenebis(indenyl) zirconiumbis(p-toluenesulfonato), ethylenebis(indenyl) zirconiumbis(trifluoromethane-sulfonato), ethylenebis(4,5, 6,7-tetrahydroindenyl)zirconium dichloride, isopropylidene (cyclopentadienyl-fluorenyl)zirconium dichloride, isopropylidene(cyclopentadienyl-methylcyclopentadienyl) zirconium dichloride, dimethylsilylenebis (cyclopentadienyl)zirconium dichloride, dimethylsilylenebis(methylcyclopentadienyl)zirconium dichloride, dimethylsilylenebis(dimethylcyclopentadienyl) zirconium dichloride, dimethylsilylenebis (trimethylcyclopentadienyl)zirconium dichloride, dimethylsilylenebis(indenyl)zirconium dichloride, dimethylsilylenebis(indenyl)zirconiumbis(trifluoromethanesulfonato), dimethylsilylenebis(4,5,6,7-tetrahydroindenyl)zirconium dichloride, dimethylsilylene (cyclopentadienyl-fluorenyl)zirconium dichloride, diphenylsilylenebis(indenyl)zirconium dichloride, methylphenylsilylenebis(indenyl)zirconium dichloride, bis (cyclopentadienyl)zirconium dichloride, bis (cyclopentadienyl)zirconium dibromide, bis (cyclopentadienyl)methylzirconium monochloride, bis (cyclopentadienyl)ethylzirconium monochloride, bis (cyclopentadienyl)cyclohexylzirconium monochloride, bis (cyclopentadienyl)phenylzirconium monochloride, bis (cyclopentadienyl)benzylzirconium monochloride, bis (cyclopentadienyl)zirconium monochloride monohydride, bis(cyclopentadienyl)methylzirconium monohydride, bis (cyclopentadienyl)dimethylzirconium, bis (cyclopentadienyl)diphenylzirconium, bis (cyclopentadienyl)dibenzylzirconium, bis (cyclopentadienyl)zirconium methoxychloride, bis (cyclopentadienyl)zirconium ethoxychloride, bis (cyclopentadienyl)zirconiumbis(methanesulfonato), bis (cyclopentadienyl)zirconiumbis(p-toluenesulfonato), bis (cyclopentadienyl)zirconiumbis(trifluoromethane-sulfonato), bis(methylcyclopentadienyl)zirconium dichloride, bis(dimethylcyclopentadienyl)zirconium dichloride, bis(dimethylcyclopentadienyl)zirconium ethoxychloride, bis(dimethylcyclopentadienyl)zirconiumbis (trifluorometha ne-sulfonato), bis(ethylcyclopentadienyl) zirconium dichloride, bis(methylethylcyclopentadienyl) zirconium dichloride, bis(propylcyclopentadienyl) zirconium dichloride, bis(methylpropylcyclopentadienyl) zirconium dichloride, bis(butylcyclopentadienyl)zirconium dichloride, bis(methylbutylcyclopentadienyl)zirconium dichloride, bis(methylbutylcyclopentadienyl)zirconiumbis (methane-sulfonato), bis(trimethylcyclopentadienyl) zirconium dichloride, bis(tetramethylcyclopentadienyl) zirconium dichloride, bis(pentamethylcyclopentadienyl) zirconium dichloride, bis(hexylcyclopentadienyl)zirconium dichloride, and bis(trimethylsilylcyclopentadienyl) zirconium dichloride.

In the above examples, the di-substituted cyclopentadienyl rings include 1,2- and 1,3-substituted cyclopentadienyl rings, and the tri-substituted cyclopentadienyl rings include 1,2,3- and 1,2,4-substituted cyclopentadienyl rings. The alkyl groups such as propyl and butyl include isomers such as n-, i-, sec- and tert-alkyl groups.

Also employable are compounds wherein zirconium is replaced with titanium or hafnium in the above-exemplified zirconium compounds.

The transition metal compounds represented by the formula (III) include the transition metal compounds (b-I)

represented by the formula (I) and the transition metal compounds (b-II) represented by the formula (II).

The ethylene/α-olefin copolymer (D) can be prepared by copolymerizing ethylene and an α-olefin of 3 to 20 carbon atoms in the presence of the above-mentioned olefin polymerization catalyst in such a manner that the resulting copolymer has a density of 0.850 to 0.980 g/cm$^3$.

The ethylene/α-olefin copolymer (D) is used in an amount of preferably 99 to 60 parts by weight, more preferably 95 to 60 parts by weight, based on 100 parts by weight of the ethylene/α-olefin copolymer (A) or the ethylene copolymer composition (A').

A composition comprising the ethylene/α-olefin copolymer (D) and either the ethylene/α-olefin copolymer (A) or the ethylene copolymer composition (A') can be prepared by the conventional processes previously described. The composition can be prepared by a multi-stage polymerization process wherein the copolymerization is conducted in two or more stages under different reaction conditions using one or plural polymerization reactors.

Although the ethylene/α-olefin copolymer (A) and the ethylene copolymer composition (A') according to the invention are employable without specific limitation in various fields wherein conventional ethylene copolymers have been hitherto employed, they are favorably employed particularly for producing films such as cast film and inflation film and sheets such as extruded sheet. The films can be obtained by ordinary air-cooling inflation molding, air-cooling two-stage inflation molding, high-speed inflation molding, T-die film molding, water-cooling inflation molding or the like. The films thus produced have excellent transparency and mechanical strength, and exhibit heat sealing properties, hot tack properties, heat resistance and good blocking tendency which are characteristic features of conventional LLDPE. Moreover, the films are free from surface tackiness because the ethylene/α-olefin copolymer or the ethylene copolymer composition shows an extremely narrow composition distribution. In addition, the copolymer (A) and the composition (A') exhibit excellent bubble stability when subjected to inflation molding, because they have high melt tension.

The films obtained by molding the ethylene/α-olefin copolymer (A) and the ethylene copolymer composition (A') are favorable as films for various packaging bags such as standardized bags, sugar bag and bags for oily or liquid materials, and agricultural films. The films can be used as multi-layer films by laminating the films onto substrates of nylon, polyester and the like.

The process for preparing an ethylene/α-olefin copolymer according to the invention comprises copolymerizing ethylene and an α-olefin of 6 to 8 carbon atoms in the presence of the olefin polymerization catalyst comprising (a) the organoaluminum oxy-compound, (b-I) the transition metal compound and (b-II) the transition metal compound. In the process of the invention, the carrier (c) and the organoaluminum compound (d) may be employed, and prepolymerization may be conducted, similarly to the aforesaid process for preparing the ethylene/α-olefin copolymer (A). The amounts of the components, prepolymerization conditions and polymerization conditions in the process of the invention are the same as those for preparing the ethylene/α-olefin copolymer (A).

EFFECT OF THE INVENTION

The ethylene/α-olefin copolymer and the ethylene copolymer composition according to the invention have high melt tension and excellent moldability. From the ethylene/α-olefin copolymer and the ethylene copolymer composition, films of excellent transparency and mechanical strength can be produced.

EXAMPLE

The present invention is further described with reference to the following examples, but it should be construed that the invention is in no way limited to those examples.

In the examples, properties of films were evaluated in the following manner.

Haze

The haze was measured in accordance with the method of ASTM D-1003-61.

Gloss

The gloss was measured in accordance with the method of JIS Z8741.

Dart Impact Strength

The dart impact strength was measured in accordance with the A method of ASTM D-1709.

Preparation Example 1

Preparation of Catalyst Component

In 80 liters of toluene, 5.0 kg of silica having been dried at 250° C. for 10 hours was suspended, and the suspension was cooled to 0° C. To the suspension, 28.7 liters of a toluene solution of methylaluminoxane (Al: 1.33 mol/l) was dropwise added over a period of 1 hour. During the addition, the temperature of the system was maintained at 0° C. Subsequently, the reaction was conducted at 0° C. for 30 minutes, then the temperature of the system was raised up to 95° C. over a period of 1.5 hours, and at that temperature, the reaction was conducted for 20 hours. Thereafter, the temperature of the system was lowered to 60° C., and the supernatant liquid was removed by decantation.

The resulting solid was washed twice with toluene and then resuspended in 80 liters of toluene. To the system, 20.0 liters of a toluene solution of bis(methylcyclopentadienyl) zirconium dichloride (Zr: 14.0 mmol/l) was dropwise added at 80° C. over a period of 30 minutes, and the reaction was further conducted at 80° C. for 2 hours. Thereafter, the supernatant liquid was removed, and the remainder was washed twice with hexane to obtain a solid catalyst containing 3.6 mg of zirconium per 1 g of the solid catalyst.

Preparation of Prepolymerized Catalyst

To 85 liters of hexane containing 1.7 mol of triisobutylaluminum, 0.85 kg of the solid catalyst obtained above and 77 g of 1-hexene were added, and prepolymerization of ethylene was carried out at 35° C. for 3.5 hours to obtain a prepolymerized catalyst containing 3 g of polyethylene per 1 g of the solid catalyst.

Polymerization

In a continuous type fluidized bed gas phase polymerization reactor, copolymerization of ethylene and 1-hexene was carried out at a polymerization temperature of 80° C. under the total pressure of 20 kg/cm$^2$-G. To the system were continuously fed the above-obtained prepolymerized catalyst at a rate of 0.05 mmol/hr in terms of a zirconium atom and triisobutylaluminum at a rate of 10 mmol/hr, During the polymerization, ethylene, 1-hexene, hydrogen and nitrogen were continuously fed in order to maintain the gas composition constant (gas composition: 1-hexene/ethylene=0.020, hydrogen/ethylene=9.5×10$^{-4}$, ethylene concentration= 50%). The yield of a polymer was 4.1 kg/hr. The obtained ethylene/α-olefin copolymer (B-1) was melt kneaded and pelletized. The melt properties and other properties of the copolymer (B-1) are set forth in Table 1.

Preparation Example 2

Preparation of Catalyst Component

A solid catalyst component was prepared in the same manner as in the "preparation of catalyst component" in Preparation Example 1, except that 8.2 liters of a toluene solution of bis(1,3-n-butylmethylcyclopentadienyl) zirconium dichloride (Zr: 34.0 mmol/l) was used in place of 20.0 liters of a toluene solution of bis (methylcyclopentadienyl)zirconium dichloride (Zr: 14.0 mmol/l).

Preparation of Prepolymerized Catalyst

A prepolymerized catalyst was obtained in the same manner as in Preparation Example 1, except that the solid catalyst component obtained in the above-mentioned "preparation of catalyst component" was used.

Polymerization

An ethylene copolymer (C-1) was obtained in the same manner as in Preparation Example 1, except that the prepolymerized catalyst obtained in the above-mentioned "preparation of prepolymerized catalyst" was used and the gas composition was varied to: 1-hexene/ethylene=0.020, hydrogen/ethylene=5.0×10$^{-4}$, and ethylene concentration= 50%. The properties of the ethylene copolymer (C-1) are set forth in Table 1.

Example 1

Preparation of Catalyst Component

A solid catalyst component was prepared in the same manner as in the "preparation of catalyst component" in Preparation Example 1, except that 5.8 liters of a toluene solution of bis(1,3-n-butylmethylcyclopentadienyl) zirconium dichloride (Zr: 34.0 mmol/l) and 6.0 liters of a toluene solution of bis(methylcyclopentadienyl)zirconium dichloride (Zr: 14.0 mmol/l) were used in place of 20.0 liters of a toluene solution of bis(methylcyclopentadienyl) zirconium dichloride (Zr: 14.0 mmol/l).

Preparation of Prepolymerized Catalyst

A prepolymerized catalyst was obtained in the same manner as in Preparation Example 1, except that the solid catalyst component obtained in the above-mentioned "preparation of catalyst component" was used.

Polymerization

An ethylene copolymer (A-1) was obtained in the same manner as in Preparation Example 1, except that the prepolymerized catalyst obtained in the above-mentioned "preparation of prepolymerized catalyst" was used and the gas composition was varied to: 1-hexene/ethylene=0.020, hydrogen/ethylene=4.5×10$^{-4}$, and ethylene concentration= 50%. The properties of the ethylene copolymer (A-1) are set forth in Table 1.

Example 2

Polymerization

An ethylene/α-olefin copolymer (A-2) was obtained in the same manner as in Example 1, except that the gas composition was controlled so that the ethylene/α-olefin copolymer (A-2) had MFR and a density shown in Table 1.

Example 3

Polymerization

An ethylene/α-olefin copolymer (A-3) was obtained in the same manner as in Example 1, except that the gas composition was controlled so that the ethylene/α-olefin copolymer (A-3) had MFR and a density shown in Table 1.

Comparative Example 1

Polymerization

An ethylene/α-olefin copolymer (C-2) was obtained in the same manner as in Preparation Example 1, except that the gas composition was controlled so that the ethylene/α-olefin copolymer (C-2) had MFR and a density shown in Table 1.

Comparative Example 2

Preparation of Catalyst Component

A solid catalyst component was prepared in the same manner as in the "preparation of catalyst component" in Preparation Example 1, except that 10.0 liters of a toluene solution of bis(1,3-dimethylcyclopentadienyl)zirconium dichloride (Zr: 28.0 mmol/l) was used in place of 20.0 liters of a toluene solution of bis(methylcyclopentadienyl) zirconium dichloride (Zr: 14.0 mmol/l).

Preparation of Prepolymerized Catalyst

A prepolymerized catalyst was prepared in the same manner as in Preparation Example 1, except that the solid catalyst component obtained in the above-mentioned "preparation of catalyst component" was used.

Polymerization

An ethylene/α-olefin copolymer (D) was obtained in the same manner as in Preparation Example 1, except that the prepolymerized catalyst obtained in the above-mentioned "preparation of prepolymerized catalyst" was used and the gas composition was controlled so that the ethylene/α-olefin copolymer (D) had MFR and a density shown in Table 1.

Example 4

The ethylene/α-olefin copolymer (B-1) obtained in Preparation Example 1 and the ethylene/α-olefin copolymer (C-1) obtained in Preparation Example 2 were melt kneaded in a weight ratio of 80/20 ((B-1)/(C-1)) and pelletized, to obtain an ethylene copolymer composition (A'-1).

The melt properties and other properties of the ethylene copolymer composition (A'-1) are set forth in Table 1.

Examples 5–8, Comparative Examples 3 & 4

From the pellets of each of the ethylene/α-olefin copolymers and the ethylene copolymer composition shown in Table 3, an inflation film having a thickness of 30 μm was produced by a single-screw extruder having a diameter of 20 mmφ and L/D of 26 under the conditions of a die diameter of 25 mmφ, a lip width of 0.7 mm, an air flow rate (by a single slit air ring) of 90 l/min, an extrusion rate of 9 g/min, a blow ratio of 1.8, a take-up rate of 2.4 m/min and a processing temperature of 200° C. The properties of the film are set forth in Table 3.

Example 9

Ethylene/α-olefin copolymers (A-4) and (A-5) were each prepared in the same manner as in Example 1, except that the gas composition was controlled so that each of the ethylene/α-olefin copolymers (A-4) and (A-5) had a density and MFR shown in Table 1. The ethylene/α-olefin copolymers (A-4) and (A-5) were melt kneaded in a weight ratio of 60/40 ((A-4)/(A-5)) and pelletized, to obtain an ethylene copolymer composition (L-1). From the pellets of the ethylene copolymer composition (L-1), an inflation film was produced in the same manner as in Examples 5 to 8. The results are set forth in Tables 2 and 3.

Example 10

An ethylene/α-olefin copolymer (A-6) was prepared in the same manner, as in Example 1, except that the gas composition was controlled so that the ethylene/α-olefin copolymer, (A-6) had a density and MFR shown in Table 1. The ethylene/α-olefin copolymer (A-6) and the ethylene/α-olefin copolymer (A-5) prepared in Example 9 were melt kneaded in a weight ratio of 60/40 ((A-6)/(A-5)) and pelletized, to obtain an ethylene copolymer composition (L-2). From the pellets of the ethylene copolymer composition (L-2), an inflation film was produced in the same manner as in Examples 5 to 8. The results are set forth in Tables 2 and 3.

Example 11

Ethylene/α-olefin copolymers (A-7) and (A-8) were each prepared in the same manner as in Example 1, except that the gas composition was controlled so that each of the ethylene/α-olefin copolymers (A-7) and (A-8) had a density and MFR shown in Table 1. The ethylene/α-olefin copolymers (A-7) and (A-8) were melt kneaded in a weight ratio of 60/40 ((A-7)/(A-8)) and pelletized, to obtain an ethylene copolymer composition (L-3). From the pellets of the ethylene copolymer composition (L-3), an inflation film was produced in the same manner as in Examples 5 to 8. The results are set forth in Tables 2 and 3.

TABLE 1

| | | Type of comonomer | x (mol %) | MFR (g/10 min) | Density (g/cm$^3$) | Decane-soluble component fraction W (wt %) | *1 | Melting point Tm (° C.) |
|---|---|---|---|---|---|---|---|---|
| Prep. Ex. 1 | B-1 | 1-hexene | 2.20 | 0.20 | 0.925 | 0.17 | 0.99 | 117.30 |
| Prep. Ex. 2 | C-1 | 1-hexene | 2.50 | 1.50 | 0.925 | 0.15 | 0.99 | 116.50 |
| Ex. 1 | A-1 | 1-hexene | 2.60 | 1.10 | 0.924 | 0.20 | 1.08 | 117.10 |
| Ex. 2 | A-2 | 1-hexene | 2.10 | 1.50 | 0.928 | 0.12 | 0.76 | 118.30 |
| Ex. 3 | A-3 | 1-hexene | 3.50 | 1.90 | 0.915 | 0.29 | 2.52 | 114.40 |
| Ex. 4 | A'-1 | 1-hexene | 2.50 | 1.20 | 0.925 | 0.15 | 0.99 | 117.20 |
| Comp. Ex. 1 | C-2 | 1-hexene | 2.60 | 1.10 | 0.925 | 0.19 | 0.99 | 116.60 |
| Comp. Ex. 2 | D | 1-hexene | 2.50 | 1.00 | 0.923 | 0.21 | 1.19 | 115.40 |
| Ex. 9 | A-4 | 1-hexene | 3.20 | 0.39 | 0.912 | 0.32 | 3.36 | 109.80 |
| Ex. 9 | A-5 | 1-hexene | 0.80 | 30 | 0.945 | 0.03 | 0.37 | 128.60 |
| Ex. 10 | A-6 | 1-hexene | 3.00 | 0.48 | 0.915 | 0.29 | 2.52 | 111.60 |
| Ex. 11 | A-7 | 1-hexene | 2.80 | 0.32 | 0.921 | 0.21 | 1.43 | 113.50 |
| Ex. 11 | A-8 | 1-hexene | 1.80 | 48 | 0.932 | 0.38 | 1.24 | 119.80 |

| | | *2 | MT (g) | *3 | *4 | Ea × 10$^{-4}$ (J/molK) | *5 | *6 | Mw/Mn |
|---|---|---|---|---|---|---|---|---|---|
| Prep. Ex. 1 | B-1 | 122.00 | 21.40 | 25.60 | 8.50 | 3.08 | 3.01 | 3.35 | 2.60 |
| Prep. Ex. 2 | C-1 | 122.00 | 1.20 | 7.00 | 1.60 | 3.01 | 3.03 | 3.42 | 2.00 |
| Ex. 1 | A-1 | 121.60 | 3.70 | 8.40 | 2.00 | 3.04 | 3.04 | 3.44 | 2.20 |
| Ex. 2 | A-2 | 123.20 | 3.30 | 7.00 | 1.60 | 3.02 | 3.00 | 3.33 | 2.20 |
| Ex. 3 | A-3 | 118.00 | 3.00 | 5.90 | 1.30 | 3.15 | 3.09 | 3.64 | 2.30 |
| Ex. 4 | A'-1 | 122.00 | 3.40 | 8.00 | 1.90 | 3.05 | 3.03 | 3.42 | 2.33 |
| Comp. Ex. 1 | C-2 | 122.00 | 1.60 | 8.40 | 2.00 | 3.05 | 3.04 | 3.44 | 2.00 |
| Comp. Ex. 2 | D | 121.20 | 3.50 | 9.00 | 2.20 | 3.51 | 3.03 | 3.42 | 2.80 |
| Ex. 9 | A-4 | 116.80 | 10.80 | 16.60 | 4.90 | 3.10 | 3.07 | 3.57 | 2.20 |
| Ex. 9 | A-5 | 130.00 | — | — | — | — | — | — | 2.10 |
| Ex. 10 | A-6 | 118.00 | 10.10 | 14.50 | 4.10 | 3.08 | 3.06 | 3.53 | 2.30 |
| Ex. 11 | A-7 | 120.40 | 11.50 | 18.90 | 5.70 | 3.08 | 3.05 | 3.49 | 2.20 |
| Ex. 11 | A-8 | 124.80 | — | — | — | — | — | — | 2.00 |

*1: MFR ≦ 10 g/10 min
value of $80 \times \exp(-100(d - 0.88)) + 0.1$
MFR > 10 g/10 min
value of $80 \times (MFR - 9)^{0.26} \times \exp(-100(d - 0.88)) + 0.1$
*2: value of $400 \times d - 248$
*3: value of $9.0 \times MFR^{-0.65}$
*4: value of $2.2 \times MFR^{-0.84}$
*5: value of $(0.039 \ln(C - 2) + 0.0096) \times x + 2.87$,
C: carbon atom number of comonomer (1-hexene: 6),
x: content (mol %) of comonomer
*6: value of $(0.039 \ln(C - 2) + 0.1660) \times x + 2.87$,
C: carbon atom number of comonomer (1-hexene: 6),
x: content (mol %) of comonomer

TABLE 2

|  |  | C-I | C-II | C-I/C-II | MFR (g/10 min) | Density (g/cm³) | MT (g) | *3 | *4 | FI (l/sec) | *7 |
|---|---|---|---|---|---|---|---|---|---|---|---|
| Ex. 9 | L-1 | A-4 | A-5 | 60/40 | 1.52 | 0.925 | 4.1 | 6.9 | 1.5 | 270 | 150 |
| Ex. 10 | L-2 | A-6 | A-5 | 60/40 | 1.63 | 0.928 | 2.7 | 6.6 | 1.5 | 290 | 160 |
| Ex. 11 | L-3 | A-7 | A-8 | 60/40 | 1.48 | 0.926 | 3.8 | 7.0 | 1.6 | 260 | 150 |

*3: value of $9.0 \times \text{MFR}^{-0.65}$
*4: value of $2.2 \times \text{MFR}^{-0.84}$
*7: value of $100 \times \text{MFR}$

TABLE 3

|  |  | Haze (%) | *8 | FI (l/sec) | *7 | Gloss (%) | Dart impact strength (N) |
|---|---|---|---|---|---|---|---|
| Ex. 5 | A-1 | 3.90 | 4.7 | 90 | 110 | 93 | 3.77 |
| Ex. 6 | A-2 | 4.20 | 4.7 | 120 | 150 | 92 | 3.21 |
| Ex. 7 | A-3 | 3.40 | 3.8 | 150 | 190 | 98 | >10 |
| Ex. 8 | A'-1 | 4.40 | 4.5 | 90 | 120 | 90 | 3.50 |
| Comp. Ex. 3 | C-2 | 11.2 | 2.8 | 70 | 110 | 60 | 3.68 |
| Comp. Ex. 4 | D | 8.9 | 4.5 | 350 | 100 | 56 | 2.30 |
| Ex. 9 | L-1 | 7.7 | 9.9 | 270 | 152 | 74 | 3.89 |
| Ex. 10 | L-2 | 6.5 | 8.4 | 290 | 163 | 85 | 3.33 |
| Ex. 11 | L-3 | 7.0 | 9.7 | 260 | 148 | 79 | 3.91 |

|  |  | Moldability *9 | MFR (g/10 min) | MT | Density (g/cm³) | Ea × 10⁻⁴ (J/molK) |
|---|---|---|---|---|---|---|
| Ex. 5 | A-1 | AA | 1.10 | 3.70 | 0.924 | 3.04 |
| Ex. 6 | A-2 | AA | 1.50 | 3.30 | 0.928 | 3.02 |
| Ex. 7 | A-3 | AA | 1.90 | 3.30 | 0.915 | 3.15 |
| Ex. 8 | A'-1 | AA | 1.20 | 3.40 | 0.925 | 3.05 |
| Comp. Ex. 3 | C-2 | CC | 1.10 | 1.60 | 0.925 | 3.05 |
| Comp. Ex. 4 | D | AA | 1.00 | 3.50 | 0.923 | 3.51 |
| Ex. 9 | L-1 | AA | 1.52 | 4.10 | 0.925 | 3.11 |
| Ex. 10 | L-2 | BB | 1.63 | 2.70 | 0.928 | 3.05 |
| Ex. 11 | L-3 | AA | 1.48 | 3.80 | 0.926 | 3.09 |

*7: value of $100 \times \text{MFR}$
*8: FI ≥ 100 MFR (FI: flow index, MFR: melt flow rate):
carbon atom number (C) of α-olefin = 6:
value of $0.45/(1 - d) \times \log(3 \times \text{MT}^{1.4}) \times (C - 3)^{0.1}$
carbon atom number (C) of α-olefin = 7 or 8:
value of $0.50/(1 - d) \times \log(3 \times \text{MT}^{1.4})$
FI < 100 MFR (FI: flow index, MFR: melt flow rate):
carbon atom number (C) of α-olefin = 6:
value of $0.25/(1 - d) \times \log(3 \times \text{MT}^{1.4}) \times (C - 3)^{0.1}$
carbon atom number (C) of α-olefin = 7 or 8:
value of $0.50/(1 - d) \times \log(3 \times \text{MT}^{1.4})$
(d: density (g/cm³), MT: melt tension (g))
*9: moldability
AA: MT ≥ 3
BB: 2 ≤ MT < 3
CC: MT < 2

What is claimed is:

1. An ethylene/α-olefin copolymer (A) which is a copolymer of ethylene and an α-olefin of 6 to 8 carbon atoms and has the following properties:

(A-i) the melt tension (MT) at 190° C. and the melt flow rate (MFR) satisfy the following relation $$9.0 \times \text{MFR}^{-0.65} > \text{MT} > 2.2 \times \text{MFR}^{-0.84},$$

(A-ii) the flow activation energy ($(E_a) \times 10^{-4}$ J/molK) determined from a shift factor of time-temperature superposition of the flow curve, the carbon atom number (C) of the α-olefin in the copolymer and the α-olefin content (x mol %) in the copolymer satisfy the following relation $$(0.039\text{Ln}(C-2)+0.0096) \times x+2.87 < (E_a) \times 10^{-4} \leq (0.039\text{Ln}(C-2)+0.1660) \times x+2.87,$$

and (A-iii) the haze of a film having a thickness of 30 μm produced from the copolymer by inflation molding satisfies the following conditions:
where the flow index (FI) defined as a shear rate which is given when the shear stress reaches $2.4 \times 10^6$ dyne/cm² at 190° C. and the melt flow rate (MFR) satisfy the relation FI ≥ 100×MFR,
in case of the carbon atom number (C) of the α-olefin being 6, $$\text{Haze} < 0.45/(1-d) \times \log(3 \times \text{MT}^{1.4}) \times (C-3)^{0.1}$$

in case of the carbon atom number (C) of the α-olefin being 7 or 8, $$\text{Haze} < 0.50/(1-d) \times \log(3 \times \text{MT}^{1.4}),$$

and
where the flow index (FI) defined as a shear rate which is given when the shear stress reaches $2.4 \times 10^6$ dyne/cm² at 190° C. and the melt flow rate (MFR) satisfy the relation FI < 100×MFR,
in case of the carbon atom number (C) of the α-olefin being 6, $$\text{Haze} < 0.25/(1-d) \times \log(3 \times \text{MT}^{1.4}) \times (C-3)^{0.1},$$

in case of the carbon atom number (C) of the α-olefin being 7 or 8, $$\text{Haze} < 0.50/(1-d) \times \log(3 \times \text{MT}^{1.4})$$

wherein d represents density (g/cm³) and MT represents melt tension (g).

2. The ethylene/α-olefin copolymer (A) as claimed in claim 1, which is obtained by copolymerizing ethylene and an α-olefin of 6 to 8 carbon atoms in the presence of an olefin polymerization catalyst comprising:

(a) an organoaluminum oxy-compound;
(b-I) at least one transition metal compound selected from transition metal compounds represented by the following formula (I):

$$ML^1_x \quad (I)$$

wherein M is a transition metal atom selected from Group 4 of the periodic table; $L^1$ is a ligand coordinated to the transition metal atom M, at least two ligands $L^1$ are each a substituted cyclopentadienyl group having at least one group selected from hydrocarbon groups of 3 to 10 carbon atoms, and the ligand $L^1$ other than the substituted cyclopentadienyl group is a hydrocarbon group of 1 to 12 carbon atoms, an alkoxy group, an aryloxy group, a trialkylsilyl group, a halogen atom or a hydrogen atom; and x is a valence of the transition metal atom M; and (b-II) at least one transition metal compound selected from transition metal compounds represented by the following formula (II):

$$ML^2_x \qquad (II)$$

wherein M is a transition metal atom selected from Group 4 of the periodic table; $L^2$ is a ligand coordinated to the transition metal atom M, at least two ligands $L^2$ are each a methylcyclopentadienyl group or an ethylcyclopentadienyl group, and the ligand $L^2$ other than the methylcyclopentadienyl group or the ethylcyclopentadienyl group is a hydrocarbon group of 1 to 12 carbon atoms, an alkoxy group, an aryloxy group, a trialkylsilyl group, a halogen atom or a hydrogen atom; and x is a valence of the transition metal atom M.

3. The ethylene/α-olefin copolymer (A) as claimed in claim 2, which is obtained by copolymerizing ethylene and an α-olefin of 6 to 8 carbon atoms in the presence of the olefin polymerization catalyst further comprising (c) a carrier on which the organoaluminum oxy-compound (a), the transition metal compound (b-I) and the transition metal compound (B-II) are supported.

4. An ethylene copolymer composition (A') comprising:
(B) an ethylene/α-olefin copolymer, and
(C) an ethylene/α-olefin copolymer,
said ethylene/α-olefin copolymer (B) being a copolymer of ethylene and an α-olefin of 6 to 8 carbon atoms and having the following properties:
(B-i) the density is in the range of 0.880 to 0.970 g/cm$^3$,
(B-ii) the melt flow rate (MFR) at 190° C. under a load of 2.16 kg is in the range of 0.02 to 200 g/10 min,
(B-iii) the decane-soluble component fraction (W) at room temperature and the density (d) satisfy the following relation
in case of MFR≦10 g/10 min, W<80×exp(−100(d−0.88))+0.1, in case of MFR>10 g/10 min, W<80×(MFR−9)$^{0.26}$×exp(−100(d−0.88))+0.1, (B-iv) the temperature (Tm) at the maximum peak position of an endothermic curve of the copolymer as measured by a differential scanning calorimeter (DSC) and the density (d) satisfy the following relation Tm<400×d−248, (B-v) the melt tension (MT) at 190° C. and the melt flow rate (MFR) satisfy the following relation 9.0×MFR$^{−0.65}$>MT>2.2×MFR$^{−0.84}$, (B-vi) the flow activation energy ((E$_a$)×10$^{−4}$ J/molK) determined from a shift factor of time-temperature superposition of the flow curve, the carbon atom number (C) of the α-olefin in the copolymer and the α-olefin content (x mol %) in the copolymer satisfy the following relation (0.039Ln(C−2)+0.0096)×x+2.87<(E$_a$)×10$^{−4}$≦(0.039Ln(C−2)+0.1660)×x+2.87 and
(B-vii) the ratio (Mw/Mn) of the weight-average molecular weight (Mw) to the number-average molecular weight (Mn), as determined by GPC, satisfies the following condition 2.2<Mw/Mn<3.5;

said ethylene/α-olefin copolymer (C) being a copolymer of ethylene and an α-olefin of 6 to 8 carbon atoms and having the following properties:
(C-i) the density is in the range of 0.880 to 0.970 g/cm$^3$,
(C-ii) the melt flow rate (MFR) at 190° C. under a load of 2.16 kg is in the range of 0.02 to 200 g/10 min,
(C-iii) the decane-soluble component fraction (W) at room temperature and the density (d) satisfy the following relation
in case of MFR≦10 g/10 min, W<80×exp(−100(d−0.88))+0.1, in case of MFR>10 g/10 min, W<80×(MFR−9)$^{0.26}$×exp(−100(d−0.88))+0.1, (C-iv) the temperature (Tm) at the maximum peak position of an endothermic curve of the copolymer as measured by a differential scanning calorimeter (DSC) and the density (d) satisfy the following relation Tm<400×d−248, and
(C-v) the melt tension (MT) at 190° C. and the melt flow rate (MFR) satisfy the following relation

MT≦2.2×MFR$^{−0.84}$;

wherein the ratio of the melt flow rate (MFR(C)) of the copolymer (C) to the melt flow rate (MFR(B)) of the copolymer (B) satisfies the following condition:

1<(MFR(C))/(MFR(B))≦20.

5. The ethylene copolymer composition (A') as claimed in claim 4, wherein the ethylene/α-olefin copolymers (B) and (C) are both ethylene/1-hexene copolymers and said ethylene copolymer composition (A') has the following properties:

(A'-i) the melt tension (MT) at 190° C. and the melt flow rate (MFR) satisfy the following relation 9.0×MFR$^{−0.65}$>MT>2.2×MFR$^{−0.84}$, (A'-ii) the flow activation energy ((E$_a$)×10$^{−4}$ J/molK) determined from a shift factor of time-temperature superposition of the flow curve, the carbon atom num ber (C) of 1-hexene in the copolymers (B) and (C), and the total content (x mol %) of 1-hexene in the copolymers (B) and (C) satisfy the following relation $$(0.039\text{Ln}(C-2)+0.0096)\times x+2.87<(E_a)\times 10^{-4}\leq(0.039\text{Ln}(C-2)+0.1660)\times x+2.87,$$

and (A'-iii) the haze of a film having a thickness of 30 μm produced from the copolymer composition by inflation molding satisfies the following conditions:
  where the flow index (FI) defined as a shear rate which is given when the shear stress reaches $2.4\times 10^6$ dyne/cm$^2$ at 190° C. and the melt flow rate (MFR) satisfy the relation FI≧100×MFR, $$\text{Haze}<0.45/(1-d)\times\log(3\times MT^{1.4})\times(C-3)^{0.1}$$

and
  where the flow index (FI) defined as a shear rate which is given when the shear stress reaches $2.4\times 10^6$ dyne/cm$^2$ at 190° C. and the melt flow rate (MFR) satisfy the relation FI<100×MFR, $$\text{Haze}<0.25/(1-d)\times\log(3\times MT^{1.4})\times(C-3)^{0.1}$$

wherein d represents density (g/cm$^3$), MT represents melt tension (g), and C represents the carbon atom number of 1-hexene, namely, 6.

6. The ethylene copolymer composition (A') as claimed in claim 5, further having the following property:
(A'-iv) the ratio (Mw/Mn) of the weight-average molecular weight (Mw) to the number-average molecular weight (Mn), as determined by GPC, satisfies the following condition $$2.0\leq Mw/Mn\leq 2.5.$$

7. An ethylene copolymer composition comprising:
(A) the ethylene/α-olefin copolymer as claimed in any one of claims 1 to 3, and
(D) an ethylene/α-olefin copolymer which is obtained by copolymerizing ethylene and an α-olefin of 3 to 20 carbon atoms in the presence of an olefin polymerization catalyst comprising (a) an organoaluminum oxycompound and (b-III) a transition metal compound of a transition metal of Group 4 of the periodic table containing a ligand having cyclopentadienyl skeleton, and which has the following properties:
  (D-i) the density is in the range of 0.850 to 0.980 g/cm$^3$, and
  (D-ii) the intrinsic viscosity (η), as measured in decalin at 135° C., is in the range of 0.4 to 8 dl/g;
    with the proviso that the ethylene/α-olefin copolymer (A) is not identical with the ethylene/α-olefin copolymer (D).

8. An ethylene copolymer composition comprising:
(A') the ethylene copolymer composition as claimed in any one of claims 4 to 6, and
(D) an ethylene/α-olefin copolymer which is obtained by copolymerizing ethylene and an α-olefin of 3 to 20 carbon atoms in the presence of an olefin polymerization catalyst comprising (a) an organoaluminum oxycompound and (b-III) a transition metal compound of a transition metal of Group 4 of the periodic table containing a ligand having cyclopentadienyl skeleton, and which has the following properties:
  (D-i) the density is in the range of 0.850 to 0.980 g/cm$^3$, and
  (D-ii) the intrinsic viscosity (η), as measured in decalin at 135° C., is in the range of 0.4 to 8 dl/g;
    with the proviso that each of the ethylene/α-olefin copolymers (B) and (C) is not identical with the ethylene/α-olefin copolymer (D).

* * * * *